(12) United States Patent
Han et al.

(10) Patent No.: US 9,608,910 B2
(45) Date of Patent: *Mar. 28, 2017

(54) PHYSICAL UPLINK CONTROL CHANNEL (PUCCH) RESOURCE ALLOCATION (RA) FOR A HYBRID AUTOMATIC RETRANSMISSION RE-QUEST-ACKNOWLEDGE (HARQ-ACK) TRANSMISSION

(71) Applicant: INTEL CORPORATION, Santa Clara, CA (US)

(72) Inventors: Seunghee Han, San Jose, CA (US); Yuan Zhu, Beijing (CN); Jong-Kae Fwu, Sunnyvale, CA (US); Xiaogang Chen, Beijing (CN)

(73) Assignee: INTEL CORPORATION, Santa Clara, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,099

(22) Filed: Oct. 29, 2015

(65) Prior Publication Data
US 2016/0066302 A1 Mar. 3, 2016

Related U.S. Application Data

(63) Continuation of application No. 14/555,317, filed on Nov. 26, 2014, now Pat. No. 9,191,326, which is a
(Continued)

(51) Int. Cl.
*H04J 3/00* (2006.01)
*H04L 12/801* (2013.01)
(Continued)

(52) U.S. Cl.
CPC ............ *H04L 47/12* (2013.01); *H04J 3/1694* (2013.01); *H04L 1/1671* (2013.01);
(Continued)

(58) Field of Classification Search
CPC .................................................. H04W 72/042
(Continued)

(56) References Cited

U.S. PATENT DOCUMENTS

2010/0115368 A1 5/2010 Terry et al.
2011/0216676 A1 9/2011 Li et al.
(Continued)

FOREIGN PATENT DOCUMENTS

KR 10-2011-0044727 A 4/2011
WO WO 2011/122837 A2 10/2011
(Continued)

OTHER PUBLICATIONS

3GPP; 3rd Generation Partnership Project; Technical Specifiaction Group Radio Access Network; Evolved Universal Terrestrial Radio Access (E-UTRA); Physical Channels and Modulation; 3GPP TS 36.211 v11.2.0; Feb. 2013; 109 pages; Release 11.
(Continued)

*Primary Examiner* — Iqbal Zaidi
(74) *Attorney, Agent, or Firm* — Thorpe North & Western

(57) ABSTRACT

A user equipment (UE) is disclosed. The UE can identify a downlink control channel. The UE can determine when the downlink control channel is an enhanced physical downlink control channel (EPDCCH). The UE can select an enhanced physical uplink control channel (PUCCH) resource allocation for a hybrid automatic retransmission re-quest-acknowledge (HARQ-ACK) transmission when the downlink control channel is the EPDCCH.

21 Claims, 13 Drawing Sheets

Related U.S. Application Data continuation of application No. 14/125,325, filed as application No. PCT/US2013/048348 on Jun. 27, 2013.

(60) Provisional application No. 61/719,241, filed on Oct. 26, 2012.

(51) Int. Cl.
| | | |
|---|---|---|
| *H04W 24/10* | (2009.01) | |
| *H04W 28/02* | (2009.01) | |
| *H04J 3/16* | (2006.01) | |
| *H04L 1/16* | (2006.01) | |
| *H04L 1/18* | (2006.01) | |
| *H04L 5/14* | (2006.01) | |
| *H04W 72/04* | (2009.01) | |
| *H04L 12/14* | (2006.01) | |
| *H04L 12/811* | (2013.01) | |

(52) U.S. Cl.
CPC .............. *H04L 1/1861* (2013.01); *H04L 5/14* (2013.01); *H04L 12/1407* (2013.01); *H04W 24/10* (2013.01); *H04W 28/0289* (2013.01); *H04W 72/042* (2013.01); *H04W 72/0413* (2013.01); *H04L 47/38* (2013.01)

(58) Field of Classification Search
USPC ................................................. 370/280–339
See application file for complete search history.

(56) References Cited

U.S. PATENT DOCUMENTS

| | | |
|---|---|---|
| 2012/0039275 A1 | 2/2012 | Chen et al. |
| 2013/0039291 A1 | 2/2013 | Blankenship et al. |
| 2013/0195066 A1 | 8/2013 | Lee et al. |
| 2013/0225188 A1 | 8/2013 | Seo et al. |
| 2014/0003375 A1* | 1/2014 | Nam ................. H04W 72/0406 370/329 |
| 2014/0036810 A1* | 2/2014 | Harrison ............. H04W 72/042 370/329 |
| 2014/0241298 A1 | 8/2014 | Park et al. |
| 2014/0301255 A1* | 10/2014 | Yin ........................... H04L 5/14 370/280 |

FOREIGN PATENT DOCUMENTS

| | | |
|---|---|---|
| WO | WO 2011/139069 A2 | 11/2011 |
| WO | 2012/109542 | 8/2012 |
| WO | WO 2012/109542 A1 | 8/2012 |

OTHER PUBLICATIONS

3GPP; 3rd Generation Partnership Project; Technical Specification Group Radio Access Network; Evolved Universal Terrestrial Radio Access (E-UTRA); Physical layer procedures; 3GPP TS 36.213 v11.0.0; 143 pages; Sep. 2012; Release 11.

3GPP; 3rd Generation Partnership Project; Technical Specification Group Radio Access Network; Evolved Universal Terrestrial Radio Access (E-UTRA); Physical layer procedures; 3GPP TS 36.213 v11.2.0; 173 pages; Feb. 2013; Release 11.

Huawei et al, "PUCCH ACK/NACK Resource Determination for ePDCCH", Discussion/Decision, 3GPP TSG-RAN WG1 R1-124082, Oct. 2012, Meeting 70bis, Agenda 7.5.7, 5 pages, San Diego, USA.

Intel Corporation, "PUCCH Resource Allocation for ePDCCH", Discussion/Decision, 3GPP TSG-RAN WG1 R1-123167, Aug. 2012, Meeting 70, Agenda 7.6.6, 3 pages, Qingdao, China.

Panasonic, "EPDCCH-PUCCH Resource Allocation for TDD", Discussion/Decision, 3GPP TSG-RAN WG1 R1-124545, Oct. 2012, Meeting 70bis, Agenda 7.5.7, 6 pages, San Diego, USA.

Research in Motion UK Limited, "PUCCH Resource Efficiency for ePDCCH", Discussion, 3GPP TSG-RAN WG1 R1-123623, Aug. 2012, Meeting 70, Agenda 7.6.6, 6 pages, Qingdao, China.

Samsung, "HARQ-ACK PUCCH Resources in Response to ePDCCH Detections," 3GPP TSG-RAN WG1 #69, R1-122259, May 2012, 2 pages.

* cited by examiner

| Value of 'TPC command for PUCCH' | $n^{(1,p)}_{PUCCH}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

FIG. 6
(Table 4)

| Value of 'TPC command for PUCCH' | $n^{(1)}_{PUCCH,j}$ or $(n^{(1)}_{PUCCH,j}, n^{(1)}_{PUCCH,j+1})$ |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |
| Note: $(n^{(1)}_{PUCCH,j}, n^{(1)}_{PUCCH,j+1})$ are determined from the first and second PUCCH resource lists configured by *n1PUCCH-AN-CS-List-r10* in 3GPP TS36.331, "Evolved Universal Terrestrial Radio Access (E-UTRA); Radio Resource Control (RRC) protocol specification" Release 11, respectively. ||

FIG. 7
(Table 5)

| HARQ-ACK(0), HARQ-ACK(1) | $n_{PUCCH}^{(1)}$ | $b(0)b(1)$ |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | No Transmission | |

FIG. 8
(Table 6)

| HARQ-ACK(0), HARQ-ACK(1), HARQ-ACK(2) | $n_{PUCCH}^{(1)}$ | $b(0)b(1)$ |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | |

FIG. 9
(Table 7)

| HARQ-ACK(0), HARQ-ACK(1), HARQ-ACK(2), HARQ-ACK(3) | $n_{PUCCH}^{(1)}$ | $b(0)b(1)$ |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | |

FIG. 10
(Table 8)

| A | HARQ-ACK(j) | | | |
|---|---|---|---|---|
| | HARQ-ACK(0) | HARQ-ACK(1) | HARQ-ACK(2) | HARQ-ACK(3) |
| 2 | TB1 Primary cell | TB1 Secondary cell | NA | NA |
| 3 | TB1 Serving cell1 | TB2 Serving cell1 | TB1 Serving cell2 | NA |
| 4 | TB1 Primary cell | TB2 Primary cell | TB1 Secondary cell | TB2 Secondary cell |

FIG. 11
(Table 9)

| A | HARQ-ACK(j) | | | |
|---|---|---|---|---|
| | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

FIG. 12
(Table 10)

PHYSICAL UPLINK CONTROL CHANNEL (PUCCH) RESOURCE ALLOCATION (RA) FOR A HYBRID AUTOMATIC RETRANSMISSION RE-QUEST-ACKNOWLEDGE (HARQ-ACK) TRANSMISSION

RELATED APPLICATIONS

The present application is a continuation of U.S. patent application Ser. No. 14/555,317, filed Nov. 26, 2014 which is a continuation of U.S. patent application Ser. No. 14/125,325, filed Dec. 11, 2013 which is a national stage application of International Patent Application No. PCT/US2013/048348 filed on Jun. 27, 2013 which claims the benefit of U.S. Provisional Patent Application Ser. No. 61/719,241, filed Oct. 26, 2012 all of which are hereby incorporated by reference in their entirety.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD). Time-division duplexing (TDD) is an application of time-division multiplexing (TDM) to separate downlink and uplink signals. In TDD, downlink signals and uplink signals may be carried on a same carrier frequency (i.e., shared carrier frequency) where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission can operate using different frequency carriers (i.e. separate carrier frequency for each transmission direction). In FDD, interference can be avoided because the downlink signals use a different frequency carrier from the uplink signals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6 (i.e., Table 4) illustrates a table of a physical uplink control channel (PUCCH) resource value according to acknowledgement (ACK)/negative ACK (ACK/NACK) Resource Indicator (ARI) for downlink semi-persistent scheduling (SPS) (i.e., 3GPP LTE standard Release 11 Technical Specification (TS) 36.213 Table 9.2-2) in accordance with an example;

FIG. 7 (i.e., Table 5) illustrates a table of a physical uplink control channel (PUCCH) resource value for hybrid automatic retransmission re-quest-acknowledge (HARQ-ACK) resource for PUCCH (i.e., 3GPP LTE standard Release 11 Technical Specification (TS) 36.213 Table 10.1.2.2.1-2) in accordance with an example;

FIG. 8 (i.e., Table 6) illustrates a table of a transmission of hybrid automatic repeat request-acknowledgement (HARQ-ACK) multiplexing for A=2 (i.e., 3GPP LTE standard Release 11 Technical Specification (TS) 36.213 Table 10.1.3.2-1) in accordance with an example;

FIG. 9 (i.e., Table 7) illustrates a table of a transmission of hybrid automatic repeat request-acknowledgement (HARQ-ACK) multiplexing for A=3 (i.e., 3GPP LTE standard Release 11 Technical Specification (TS) 36.213 Table 10.1.3.2-2) in accordance with an example;

FIG. 10 (i.e., Table 8) illustrates a table of a transmission of hybrid automatic repeat request-acknowledgement (HARQ-ACK) multiplexing for A=4 (i.e., 3GPP LTE standard Release 11 Technical Specification (TS) 36.213 Table 10.1.3.2-3) in accordance with an example;

FIG. 11 (i.e., Table 9) illustrates a table for mapping of transport blocks (TB) and serving cell to HARQ-ACK(j) for physical uplink control channel (PUCCH) format 1b hybrid automatic repeat request-acknowledgement (HARQ-ACK) channel selection (i.e., 3GPP LTE standard Release 11 Technical Specification (TS) 36.213 Table 10.1.2.2.1-1) in accordance with an example;

FIG. 12 (i.e., Table 10) illustrates a table for mapping of subframes on each serving cell to HARQ-ACK(j) for physical uplink control channel (PUCCH) format 1b hybrid automatic repeat request-acknowledgement (HARQ-ACK)

Figure 13:
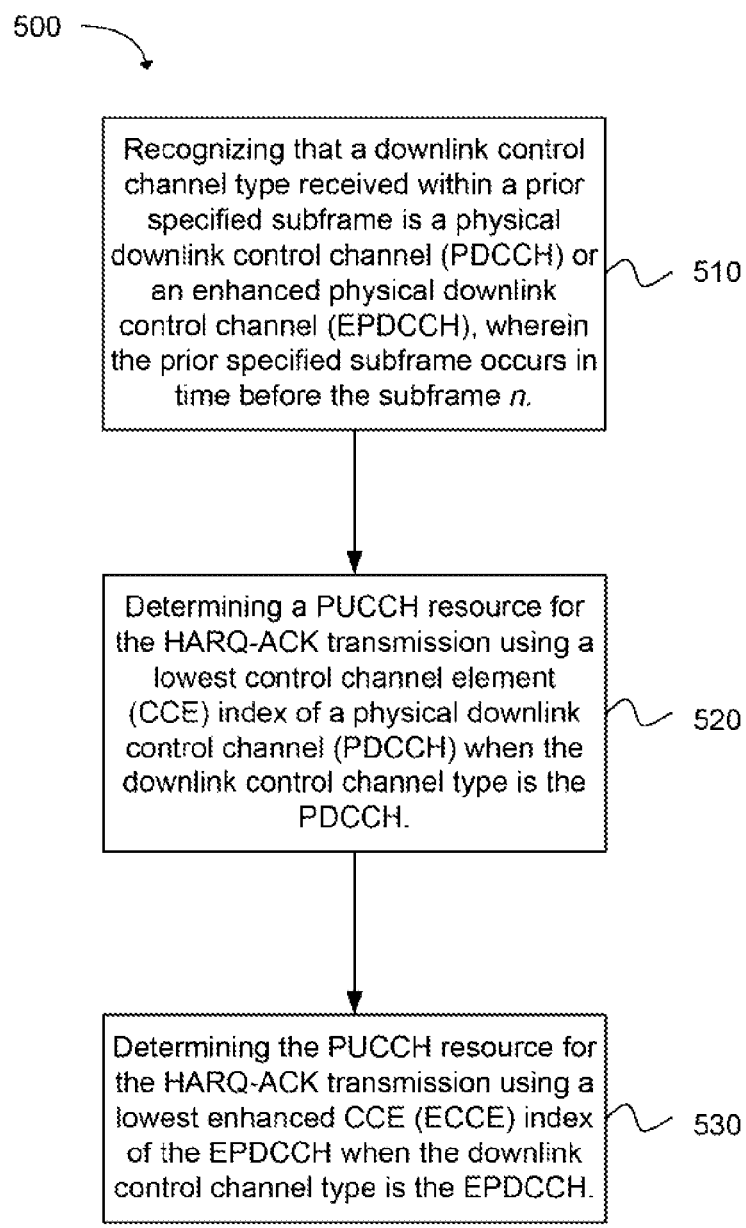
Figure 14:
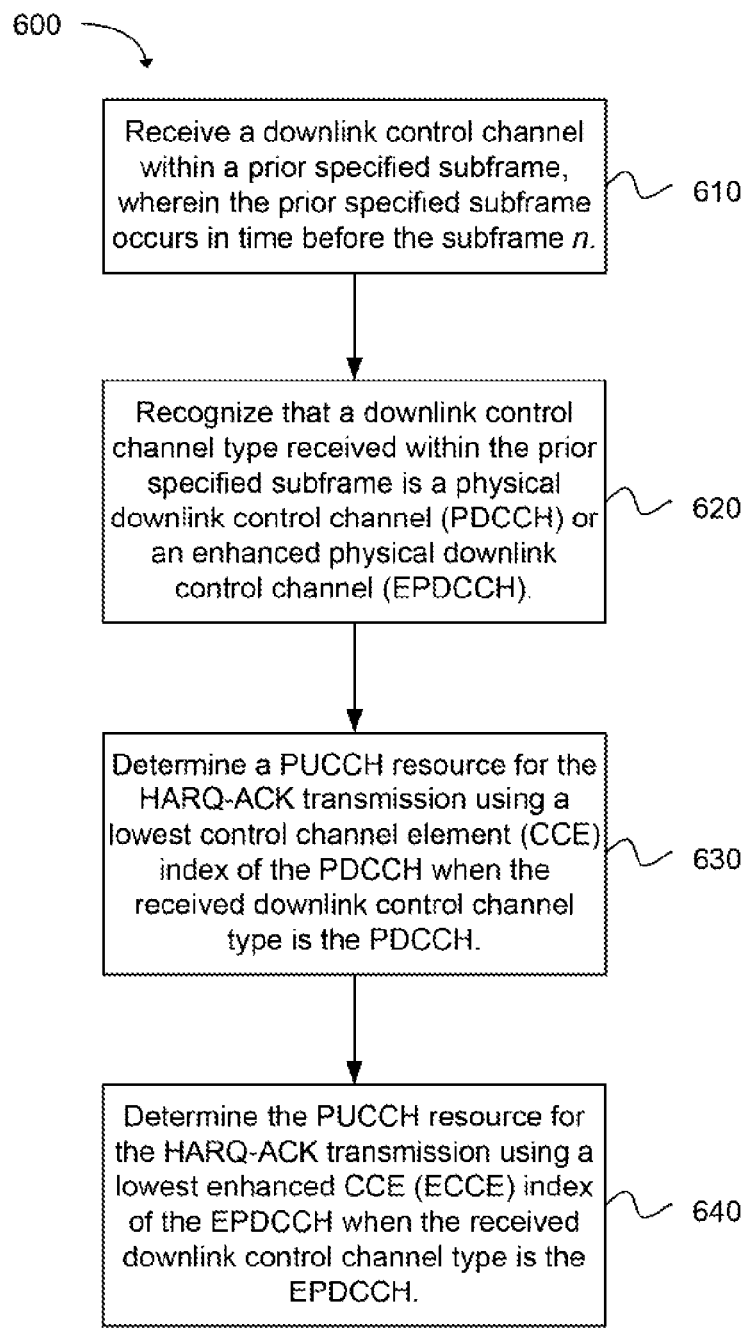
Figure 15:
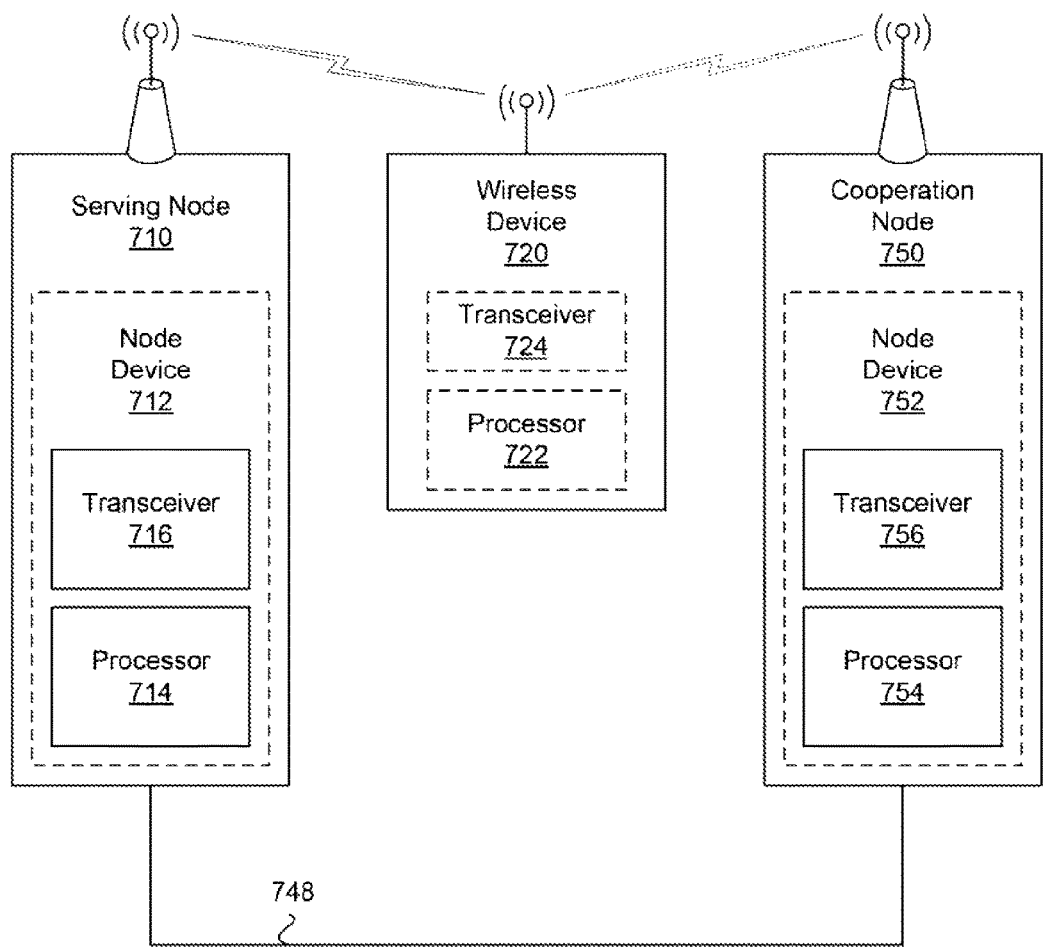
Figure 16:
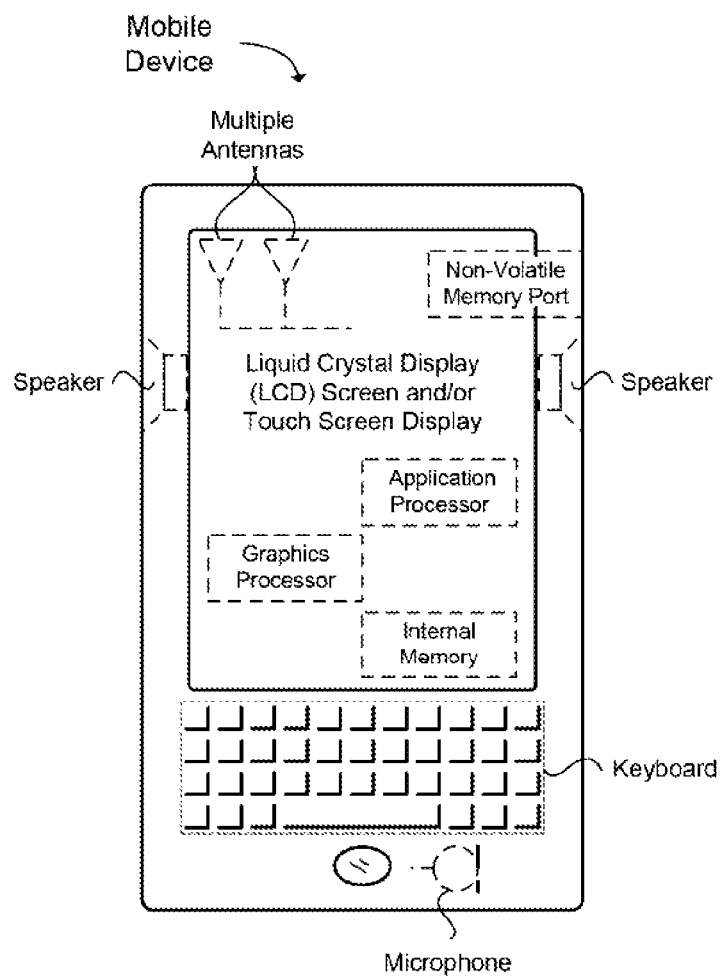

channel selection for time division duplex (TDD) with a bundling window size of M=2 (i.e., 3GPP LTE standard Release 11 Technical Specification (TS) 36.213 Table 10.1.3.2-4) in accordance with an example;

FIG. 13 depicts a flow chart of a method for conditional hybrid automatic retransmission re-quest (HARQ) mapping for carrier aggregation (CA) at a user equipment (UE) in accordance with an example;

FIG. 14 depicts functionality of computer circuitry of a user equipment (UE) operable to provide conditional hybrid automatic retransmission re-quest-acknowledge (HARQ-ACK) states mapping for carrier aggregation (CA) in accordance with an example;

FIG. 15 illustrates a block diagram of a serving node, a coordination node, and wireless device (e.g., UE) in accordance with an example; and FIG. 16 illustrates a diagram of a wireless device (e.g., UE) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The communication of data on the physical downlink shared channel (PDSCH) can be controlled via a control channel, referred to as a physical downlink control channel (PDCCH). The PDCCH can be used for downlink (DL) and uplink (UL) resource assignments, transmit power commands, and paging indicators. The PDSCH scheduling grant can be designated to a particular wireless device (e.g., UE) for dedicated PDSCH resource allocation to carry UE-specific traffic, or the PDSCH scheduling grant can be designated to all wireless devices in the cell for common PDSCH resource allocation to carry broadcast control information such as system information or paging.

Figure 1:
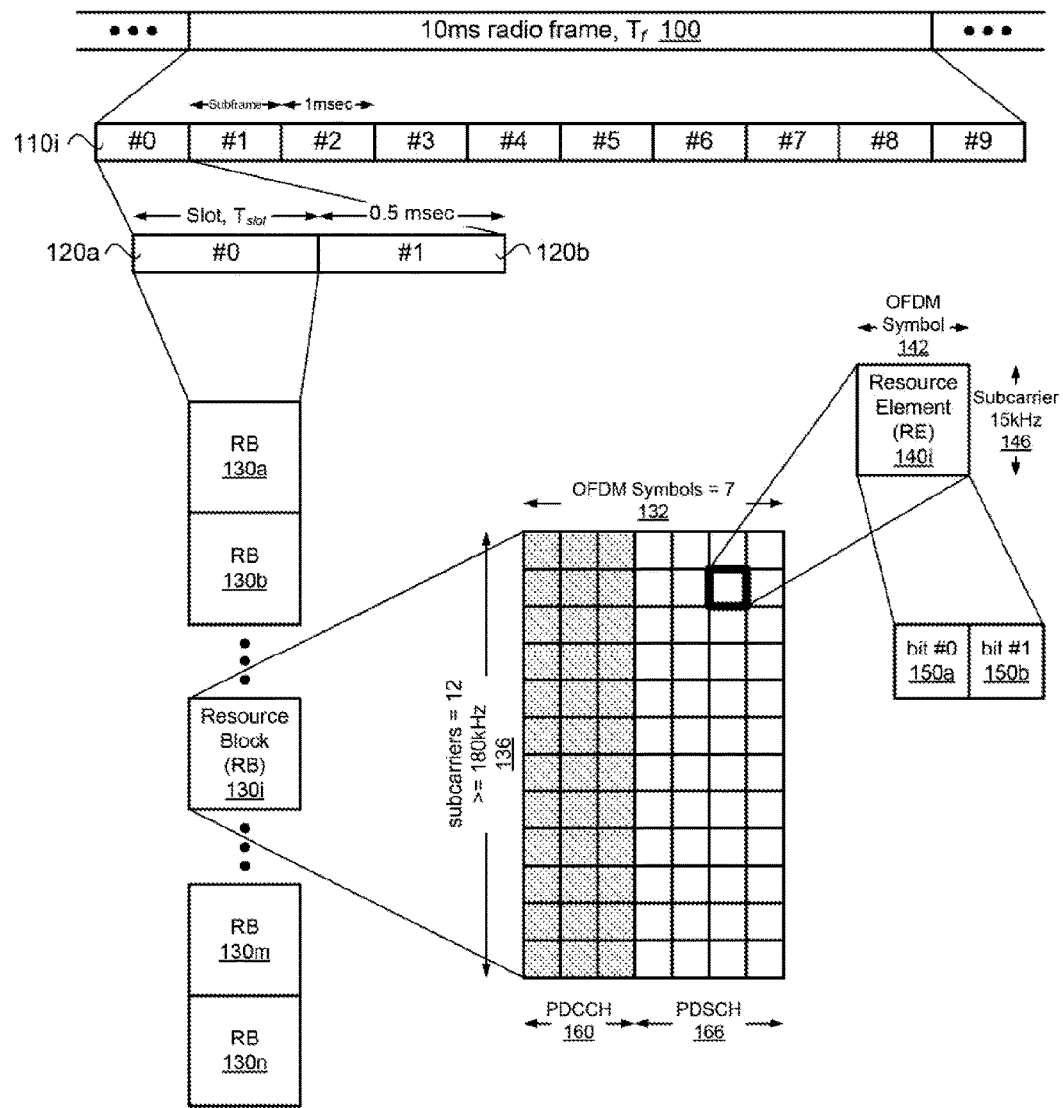
FIG. 1 illustrates a diagram of radio frame resources (e.g., a resource grid) including a legacy physical downlink control channel (PDCCH) in accordance with an example.

In one example, the PDCCH and PDSCH can represent elements of a radio frame structure transmitted on the physical (PHY) layer in a downlink transmission between a node (e.g., eNodeB) and the wireless device (e.g., UE) using a generic 3GPP long term evolution (LTE) frame structure, as illustrated in FIG. 1.

FIG. 1 illustrates a downlink radio frame structure type 2. In the example, a radio frame 100 of a signal used to transmit the data can be configured to have a duration, Tf, of 10 milliseconds (ms). Each radio frame can be segmented or divided into ten subframes 110$i$ that are each 1 ms long. Each subframe can be further subdivided into two slots 120$a$ and 120$b$, each with a duration, Tslot, of 0.5 ms. The first slot (#0) 120$a$ can include a legacy physical downlink control channel (PDCCH) 160 and/or a physical downlink shared channel (PDSCH) 166, and the second slot (#1) 120$b$ can include data transmitted using the PDSCH.

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130$i$ can include 12-15 kHz subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 2:
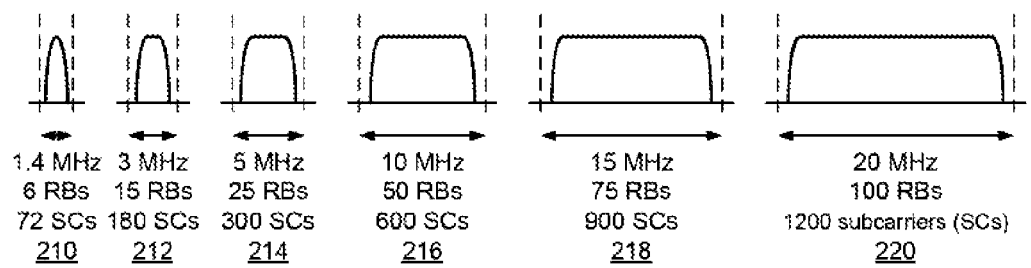
FIG. 2 illustrates a diagram of various component carrier (CC) bandwidths in accordance with an example.

Each wireless device may use at least one bandwidth. The bandwidth may be referred to as a signal bandwidth, carrier bandwidth, or component carrier (CC) bandwidth, as illustrated in FIG. 2. For example, the LTE CC bandwidths can include: 1.4 MHz 310, 3 MHz 312, 5 MHz 314, 10 MHz 316, 15 MHz 318, and 20 MHz 320. The 1.4 MHz CC can include 6 RBs comprising 72 subcarriers. The 3 MHz CC can include 15 RBs comprising 180 subcarriers. The 5 MHz CC can include 25 RBs comprising 300 subcarriers. The 10

MHz CC can include 50 RBs comprising 600 subcarriers. The 15 MHz CC can include 75 RBs comprising 900 subcarriers. The 20 MHz CC can include 100 RBs comprising 1200 subcarriers.

For each UE, a CC can be defined as a primary cell (PCell). Different UEs may not necessarily use a same CC as their PCell. The PCell can be regarded as an anchor carrier for the UE and the PCell can thus be used for control signaling functionalities, such as radio link failure monitoring, hybrid automatic repeat request-acknowledgement (HARQ-ACK), and physical uplink control channel (PUCCH) resource allocations (RA). If more than one CC is configured for a UE, the additional CCs can be denoted as secondary cells (SCells) for the UE.

The data carried on the PDCCH can be referred to as downlink control information (DCI). Multiple wireless devices can be scheduled in one subframe of a radio frame. Therefore, multiple DCI messages can be sent using multiple PDCCHs. The DCI information in a PDCCH can be transmitted using one or more control channel elements (CCE). A CCE can be comprised of a group of resource element groups (REGs). A legacy CCE can include up to nine REGs. Each legacy REG can be comprised of four resource elements (REs). Each resource element can include two bits of information when quadrature modulation is used. Therefore, a legacy CCE can include up to 72 bits of information. When more than 72 bits of information are needed to convey the DCI message, multiple CCEs can be employed. The use of multiple CCEs can be referred to as an aggregation level. In one example, the aggregation levels can be defined as 1, 2, 4 or 8 consecutive CCEs allocated to one legacy PDCCH.

The legacy PDCCH can create limitations to advances made in other areas of wireless communication. For example, mapping of CCEs to subframes in OFDM symbols can typically be spread over the control region to provide frequency diversity. However, no beam forming diversity may be possible with the current mapping procedures of the PDCCH. Moreover, the capacity of the legacy PDCCH may not be sufficient for advanced control signaling.

To overcome the limitations of the legacy PDCCH, an enhanced PDCCH (EPDCCH) can use the REs in an entire PRB or PRB pair (where a PRB pair can be two contiguous PRBs using the same subcarrier's subframe), instead of just the first one to three columns of OFDM symbols in a first slot PRB in a subframe as in the legacy PDCCH. Accordingly, the EPDCCH can be configured with increased capacity to allow advances in the design of cellular networks and to minimize currently known challenges and limitations.

Unlike the legacy PDCCH, the EPDCCH can be mapped to the same REs or region in a PRB as the PDSCH, but in different PRBs. In an example, the PDSCH and the EPD-CCH may not be multiplexed within a same PRB (or a same PRB pair). Thus if one PRB (or one PRB pair) contains an EPDCCH, the unused REs in the PRB (or PRB pair) may be blanked, since the REs may not be used for the PDSCH.

For Long Term Evolution (LTE) time division duplex (TDD) system, two types of downlink control channels (e.g., PDCCH and EPDCCH) may coexist within a certain bundling window. A PUCCH resource allocation method can be defined when the bundling window uses both the PDCCH and the EPDCCH.

Figure 3:
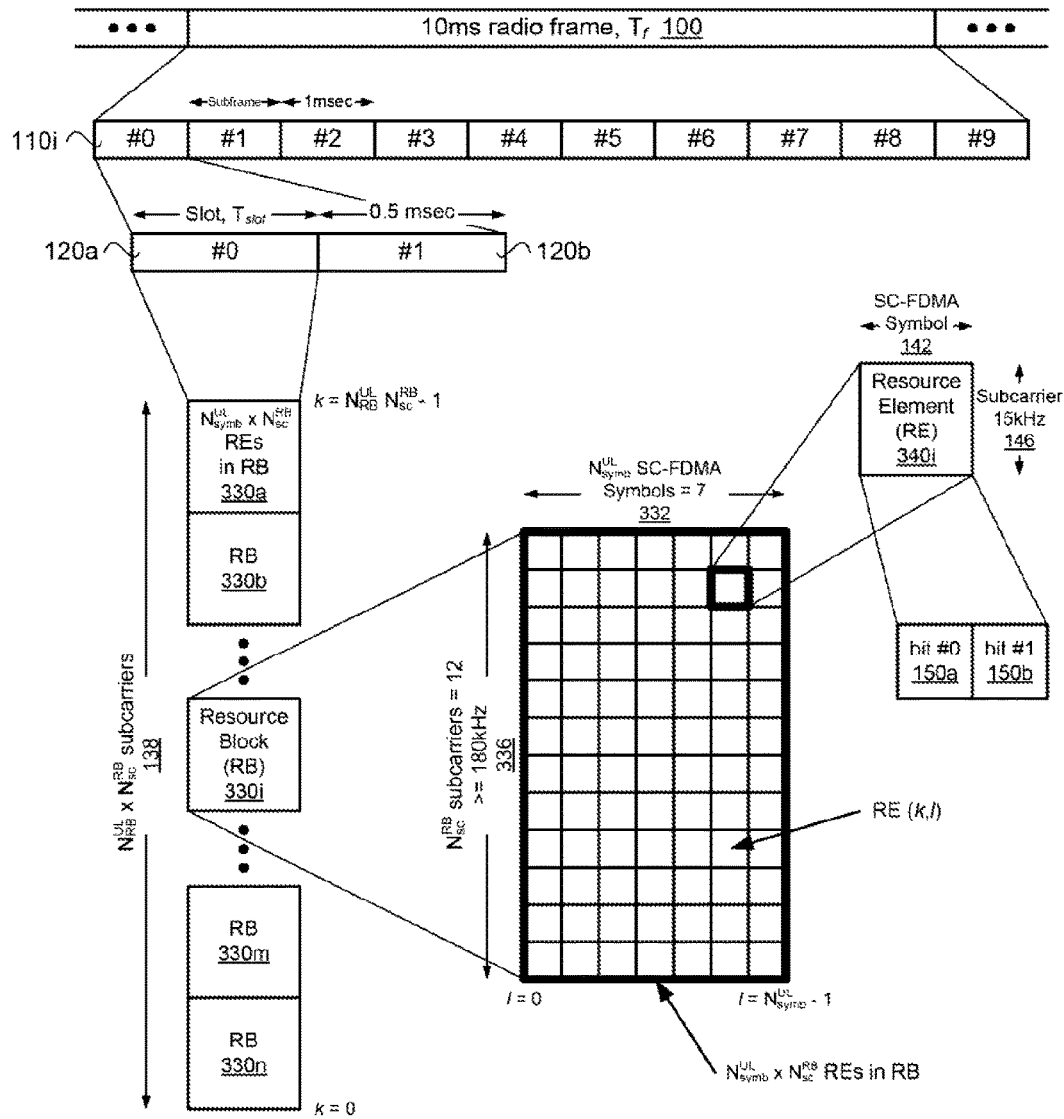
FIG. 3 illustrates a block diagram of uplink radio frame resources (e.g., a resource grid) in accordance with an example.

Referring back to FIG. 2, a component carrier can be used to carry channel information via a radio frame structure transmitted on the physical (PHY) layer in a uplink transmission between a node (e.g., eNodeB) and the wireless device (e.g., UE) using a generic long term evolution (LTE) frame structure, as illustrated in FIG. 3. While an LTE frame structure is illustrated, a frame structure for another type of communication standard using SC-FDMA or OFDMA may also be used.

FIG. 3 illustrates an uplink radio frame structure. A similar structure can be used for a downlink radio frame structure using OFDMA, as illustrated FIG. 1. In the example shown in FIG. 3, a radio frame 100 of a signal used to transmit control information or data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. Each slot for a component carrier (CC) used by the wireless device and the node can include multiple resource blocks (RBs) 330$a$, 330$b$, 330$i$, 330$m$, and 330$n$ based on the CC frequency bandwidth. Each RB (physical RB or PRB) 330$i$ can include 12-15 kHz subcarriers 336 (on the frequency axis) and 6 or 7 SC-FDMA symbols 332 (on the time axis) per subcarrier. The RB can use seven SC-FDMA symbols if a short or normal cyclic prefix is employed. The RB can use six SC-FDMA symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one SC-FDMA symbol 342 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for an uplink transmission from the wireless device to the node.

An uplink signal or channel can include data on a Physical Uplink Shared CHannel (PUSCH) or control information on a Physical Uplink Control CHannel (PUCCH). In LTE, the uplink physical channel (PUCCH) carrying uplink control information (UCI) can include channel state information (CSI) reports, Hybrid Automatic Retransmission reQuest (HARQ) ACKnowledgment/Negative ACKnowledgment (ACK/NACK) and uplink scheduling requests (SR).

The wireless device (e.g., UE) can provide HARQ-ACK feedback for a PDSCH using a PUCCH. The PUCCH can support multiple formats (i.e., PUCCH format) with various modulation and coding schemes (MCS), as shown for LTE in Table 1. Similar information to Table 1 can be shown in 3GPP LTE standard Release 11 (e.g., V11.2.0 (2013-02)) Technical Specification (TS) 36.211 Table 5.4-1. For example, PUCCH format 1b can be used to convey a two-bit HARQ-ACK, which can be used for carrier aggregation. References to tables (e.g., mapping tables) in the 3GPP LTE Release 11 may also be found in 3GPP LTE Releases 8, 9, and 10.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |

TABLE 1-continued

| PUCCH format | Modulation scheme | Number of bits per subframe, $M_{bit}$ |
|---|---|---|
| 2a | QPSK + BPSK | 21 |
| 2b | QPSK + QPSK | 22 |
| 3 | QPSK | 48 |

Legacy LTE TDD can support asymmetric UL-DL allocations by providing seven different semi-statically configured uplink-downlink configurations. Table 2 illustrates seven UL-DL configurations used in LTE, where "D" represents a downlink subframe, "S" represents a special subframe, and "U" represents an uplink subframe. In an example, the special subframe can operate or be treated as a downlink subframe. Similar information to Table 2 can be shown in 3GPP LTE TS 36.211 Table 4.2-2.

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As illustrated by Table 2, UL-DL configuration 0 can include 6 uplink subframes in subframes 2, 3, 4, 7, 8, and 9, and 4 downlink and special subframes in subframes 0, 1, 5, and 6; and UL-DL configuration 5 can include one uplink subframe in subframe 2, and 9 downlink and special subframes in subframes 0, 1, and 3-9. Each uplink subframe n can be associated with a downlink subframe based on the uplink-downlink configuration, where each uplink subframe n can have a downlink association set index $K \in \{k_0, k_1, \ldots k_{M-1}\}$ where M is defined as the number of elements in set K, as illustrated by Table 3. Similar information to Table 3 can be shown in 3GPP LTE TS 36.213 Table 10.1.3.1-1.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The Table 3 shows examples of downlink subframe bundling in an uplink subframe handling ACK/NACK feedback for certain downlink subframe(s). For example, in uplink-downlink configuration 4, uplink subframe 2 (subframe n) handles ACK/NACK feedback for downlink and special subframes which are {12, 8, 7, 11} subframes (subframes $k_m$) earlier than uplink subframe 2 (i.e., downlink and special subframes {0, 4, 5, 1} (or downlink and special subframes n-$k_m$)) and M equals 4. Uplink subframe 3 (subframe n) handles ACK/NACK feedback for downlink subframes which are {6, 5, 4, 7} subframes (subframes $k_m$) earlier than uplink subframe 3 (i.e., downlink subframes {7, 8, 9, 6} (or downlink subframes n-$k_m$)) and M equals 4. For uplink-downlink configuration 5 uplink subframe 2, M equals 9. For uplink-downlink configuration 0, uplink subframe 2, M equals one, and uplink subframe 3, M equals zero. Depending on the uplink-downlink configuration one uplink subframe may be responsible for ACK/NACK feedback for one or multiple downlink subframes. In certain situations, even distribution between uplink subframe responsibility can be desired to reduce situations where one uplink subframe is responsible for ACK/NACK feedback for a large number of downlink and special subframes.

As an underlying requirement in some examples, cells of the network can change UL-DL (TDD) configurations synchronously in order to avoid the interference. The legacy LTE TDD set of configurations can provide DL subframe allocations in the range between 40% and 90%, as shown in Table 2. The UL and DL subframes allocation within a radio frame can be reconfigured through system information broadcast signaling (e.g., system information block [SIB]). Hence, the UL-DL allocation once configured can be expected to vary semi-statically.

A property of TDD is that a number of UL and DL subframes can be different as shown in Table 2 and often the number of DL subframes can be more than the number of UL subframes for a radio frame. In configurations where more DL subframes are used than UL subframes, multiple DL subframes can be associated with one single UL subframe for the transmission of a corresponding control signals. A configuration-specific HARQ-ACK timing relationship can be defined (e.g., 3GPP LTE standard Release 11 (e.g., V11.2.0 (2013-02)) TS 36.213 Table 10.1.3.1-1 or Table 3). If a UE is scheduled M a multiple of DL subframes, which can be associated with one UL subframe, the UE can transmit multiple ACK/NAK (ACK/NACK) bits in that UL subframe. A number of DL subframes with HARQ-ACK feedback on one single UL subframe can comprise one bundling window.

Figure 4:
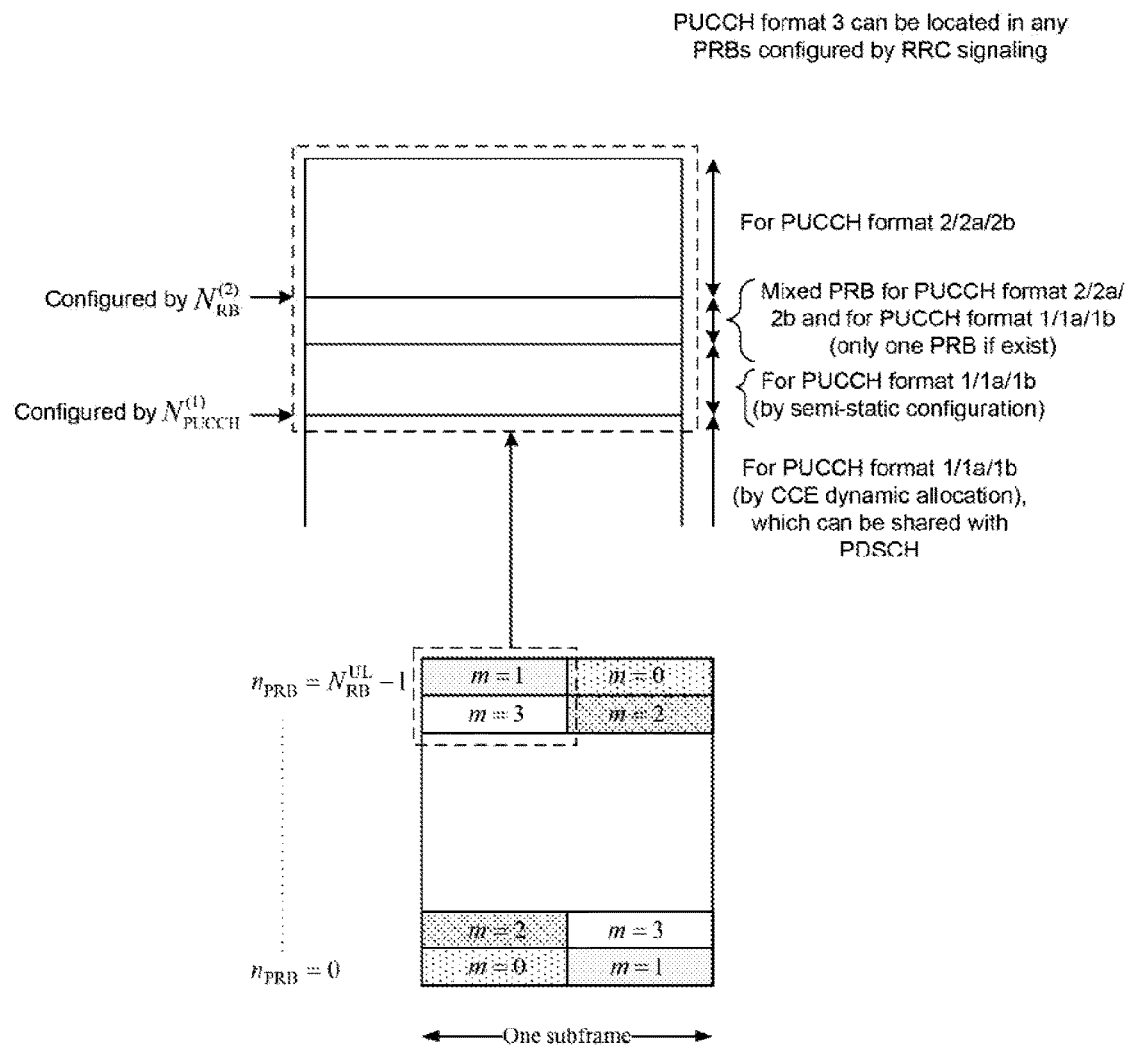
FIG. 4 illustrates a block diagram of physical uplink control channel (PUCCH) regions for long term evolution (LTE) in accordance with an example.

FIG. 4 illustrates a PUCCH resource allocation and usage with legacy PDCCH for TDD. Only the first slot is expanded or elaborated since the second slot can have symmetry by slot-level hopping for the PUCCH. The PRBs for PUCCH format 2/2a/2b can be located from a band-edge PRB to NO, which can be configured by higher layer signaling (e.g., radio resource control (RRC) signaling). If a mixed PRB for PUCCH format 2/2a/2b and PUCCH format 1/1a/1b exists, the mixed PRB can be configured by $N_{cs}^{(1)}$, where one PRB may be available for the mixed PRB. Following the mixed PRB, the PRBs for PUCCH format 1/1a/1b semi-statically configured by RRC signaling can be located. Starting from $N_{PUCCH}^{(1)}$, the PRBs for PUCCH format 1a/1b by lowest CCE index based dynamic resource allocation can exist and can be located. The PUSCH can be also transmitted in the dynamic PUCCH resource region according to scheduling policies. Any PRBs can be located for PUCCH format 3 by RRC signaling. In another example the PRBs for PUCCH format 3 can be transmitted inside of bands like other PUCCH formats.

For instance, for TDD HARQ-ACK bundling or TDD HARQ-ACK multiplexing for one configured serving cell and a subframe n with M=1 where M is the number of elements in the set K defined in Table 3, the UE can use PUCCH resource $n_{PUCCH}^{(1,\tilde{p})}$ for transmission of HARQ-ACK in subframe n for $\tilde{p}$, mapped to antenna port p for PUCCH format 1a/1b. If a PDSCH transmission is indicated by the detection of corresponding PDCCH or a PDCCH indicates a downlink semi-persistent scheduling (SPS) release within subframe(s) n−k, where k∈K and K (defined in Table 3) is a set of M elements $\{k_0, k_1, \ldots k_{M-1}\}$ depending on the subframe n and the UL-DL configuration (defined in Table 2), the UE can first select a c value out of $\{0, 1, 2, 3\}$ which makes $N_c \le n_{CCE} < N_{c+1}$ and can use $n_{PUCCH}^{(1,\tilde{p}0)} = (M-m-1) \cdot N_c + m \cdot N_{c+1} + n_{CCE} + N_{PUCCH}^{(1)}$ for antenna port $p_0$, where $N_{PUCCH}^{(1)}$ is configured by higher layers (e.g., RRC signaling), $N_c = \max\{0, \lfloor [N_{RB}^{DL} \cdot (N_{sc}^{RB} \cdot c - 4)]/36 \rfloor\}$, and $n_{CCE}$ is the number of the first CCE used for transmission of the corresponding PDCCH in subframe $n-k_m$ and the corresponding m, where $k_m$ is the smallest value in set K such that UE detects a PDCCH in subframe $n-k_m$. When a two antenna port transmission is configured for PUCCH format 1a/1b, the PUCCH resource for HARQ-ACK bundling for antenna port $p_1$ can be given by $n_{PUCCH}^{(1,\tilde{p}1)} = (M-m-1) \cdot N_c + m \cdot N_{c+1} + n_{CCE} + 1 + N_{PUCCH}^{(1)}$.

Figure 5:
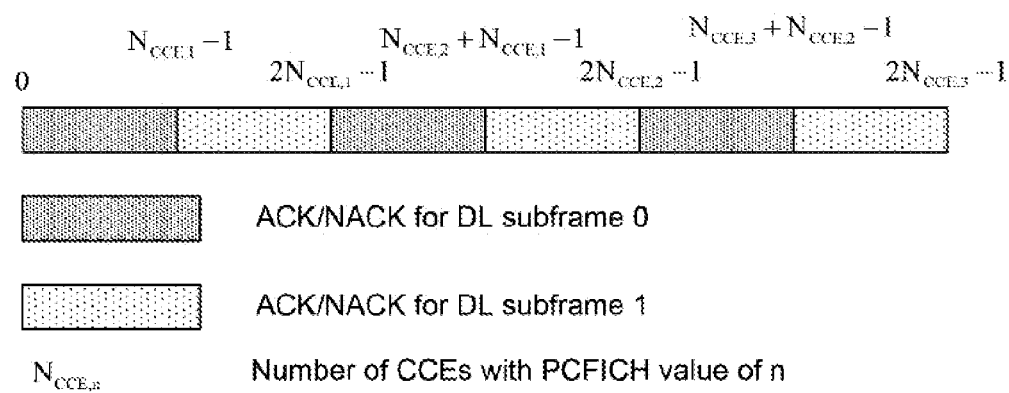
FIG. 5 illustrates a block diagram of block-interleaved mapping for physical uplink control channel (PUCCH) resource (e.g., hybrid automatic retransmission re-quest-acknowledge (HARQ-ACK)) in time division duplex (TDD) in accordance with an example.

For example, for TDD, the PUCCH resources for each DL subframe can be reserved exclusively, as much as possible, and the number of reserved resources for each DL subframe can be similar to each other by applying block interleaved mapping, as illustrated in FIG. 5. By reserving the PUCCH resources for each DL subframe, PUSCH resource can be efficiently scheduled for the DL subframes within a bundling window. The PUCCH resource for HARQ-ACK in TDD can also be determined by a function of the lowest CCE index of the scheduling PDCCH.

As for EPDCCH, the subframes can be configured for monitoring EPDCCH by higher layer signaling. Therefore, within a certain bundling window, two types of downlink control channels of PDCCH and EPDCCH may coexist. For example, for a UE assuming M=4, DL subframe m=0 and 2 can be used for PDCCH while m=1 and 3 can be used for EPDCCH according to a higher layer configuration, as shown in FIG. 4. As a result, a PUCCH resource allocation method providing for the PDCCH and the EPDCCH can be defined when the bundling window uses both the PDCCH and the EPDCCH.

For example, two different types of DL control channels (i.e., PDCCH and EPDCCH) can coexist within a bundling window. A mechanism can be used to handle PUCCH resource allocation on mixed DL subframes with PDCCH and EPDCCH within a bundling window for TDD. In a configuration, the UE can follow a resource allocation method for the DL subframe derived for an actual transmitted PUCCH resource (e.g., either PDCCH or EPDCCH). In another configuration, the UE can follow a legacy PDCCH rule (e.g., base the resource allocation on the transmitted PUCCH resource (i.e., method A)). In another configuration, the UE can follow an EPDCCH rule (e.g., base the resource allocation on the transmitted EPUCCH resource (i.e., method B)).

As used herein, a bundling window for a UE where the PDCCH and the EPDCCH can coexist is referred to as "mixed bundling window," unless otherwise stated. A method of dynamic PUCCH resource allocation in mixed bundling window for TDD is disclosed.

A dynamic PUCCH resource allocation method (e.g., method A) corresponding to legacy PDCCH (e.g., some-times referred to as a PDCCH) can be defined for TDD. A dynamic PUCCH resource allocation method (e.g., method B) corresponding to EPDCCH can also be defined for TDD. For instance, the PUCCH resource allocation between Method A and Method B can be determined by the actually used PUCCH resource (e.g., $n_{PUCCH}^{(1)}$ or $n_{PUCCH,j}^{(1)}$) derived by the DL subframe.

For example, if the actually used PUCCH resource is derived by DL subframe configured for EPDCCH, Method B may be used as the PUCCH resource allocation. If the actually PUCCH resource is derived by DL subframe not configured for EPDCCH (e.g., configured for PDCCH), Method A may be used as the PUCCH resource allocation. For example on HARQ-ACK multiplexing (i.e., PUCCH format 1b with channel selection), if a UE uses PUCCH resource $n_{PUCCH,j}^{(1)}$ for transmitting HARQ-ACK feedback and the PUCCH resource is derived by m=j within a bundling window, the PUCCH resource allocation method can be applied between Method A and B based on whether the DL subframe m for PUCCH resource derivation is configured for PDCCH or configured for EPDCCH.

As for dynamic PUCCH resource allocation of TDD in a single configured cell, the PUCCH format 1a/1b transmissions and PUCCH format 1b with channel selection (i.e., HARQ-ACK multiplexing) support implicit resource allocation determined by $n_{CCE}$ (e.g., a lowest CCE index of the PDCCH) or $n_{ECCE}$ (e.g., a lowest ECCE index of EPDCCH). For both PUCCH format 1a/1b and PUCCH format 1b with channel selection, the number of actual transmitted PUCCH resources may be one CCE. The used PUCCH resource can be determined either by the corresponding DL subframe or by a DL downlink assignment index (DAI) value within a bundling window. A downlink assignment index (DAI) can be a field in the downlink resource grant signaled to a wireless device (e.g., UE), indicating how many subframes in a previous time window contained transmissions to that wireless device. DAI can be applicable in time domain duplex (TDD) mode, and can enable the wireless device to determine whether wireless device has received all the downlink subframes or transport blocks for which the wireless device transmits a combined ACK/NACK.

In an example, the PUCCH resource allocation equation for TDD with EPDCCH can be represented as $n_{PUCCH}^{(1,\tilde{p}0)} = n_{ECCE} + \text{Value}$ where $n_{ECCE}$ can be the lowest ECCE index number and Value can consists of various parameters. As an example, Value=ARI+ AP+(m+1)·$N_{PUCCH}^{(1,k)}$ where ACK/NACK Resource Indictor (ARI) is an offset value (e.g., maybe integer value) which may be given from the DCI in EPDCCH, AP is antenna port (0, . . . , 3), m is the parameter based on Table 3, and $N_{PUCCH}^{(1,k)}$ is the UE specific starting offset value for EPDCCH set k. In another example, an ACK/NACK Resource Offset (ARO) can be substituted for ARI.

In a configuration, for TDD HARQ-ACK bundling or TDD HARQ-ACK multiplexing for one configured serving cell and a subframe n with M=1 where M is the number of elements in the set K defined in Table 3, the UE can use PUCCH resource $n_{PUCCH}^{(1,\tilde{p})}$ for transmission of HARQ-ACK in subframe n for $\tilde{p}$ mapped to antenna port p for PUCCH format 1a/1b.

If there is PDSCH transmission indicated by the detection of corresponding PDCCH/EPDCCH or there is PDCCH/EPDCCH indicating downlink SPS release within subframe(s) n−k, where k∈K and K (defined in Table 3) is a set of M elements $\{k_0, k_1, \ldots, k_{M-1}\}$ depending on the subframe n and the UL-DL configuration, and if the subframe $n-k_m$ is not configured for EPDCCH, the UE can first select a c value out of $\{0, 1, 2, 3\}$ which makes $N_c \leq n_{CCE} < N_{c+1}$ and can use $n_{PUCCH}^{(1,\tilde{p}_0)} = (M-m-1) \cdot N_c + m \cdot N_{c+1} + n_{CCE} + N_{PUCCH}^{(1)}$ for antenna port $p_0$, where $N_{PUCCH}^{(1)}$ is configured by higher layers, $N_c = \max\{0, \lfloor [N_{RB}^{DL} \cdot (N_{sc}^{RB} \cdot c - 4)]/36 \rfloor\}$, and $n_{CCE}$ is the number of the first CCE used for transmission of the corresponding PDCCH in subframe $n-k_m$ and the corresponding m, where $k_m$ is the smallest value in set K such that UE detects a PDCCH in subframe $n-k_m$ (i.e., the last DL subframe where the PDCCH is detected within a bundling window). When two antenna port transmission is configured for PUCCH format 1a/1b, the PUCCH resource for HARQ-ACK bundling for antenna port $p_1$ can be given by $$n_{PUCCH}^{(1,\tilde{p}_1)} = (M-m-1) \cdot N_c + m + N_{c+1} + n_{CCE} + 1 + N_{PUCCH}^{(1)}.$$

If there is PDSCH transmission indicated by the detection of corresponding PDCCH/EPDCCH or there is PDCCH/EPDCCH indicating downlink SPS release within subframe(s) $n-k$, where $k \in K$ and K (defined in Table 3) is a set of M elements $\{k_0, k_1, \ldots, k_{M-1}\}$ depending on the subframe n and the UL-DL configuration, and if the subframe $n-k_m$ is configured for EPDCCH, the UE can use $n_{PUCCH}^{(1,\tilde{p}_0)} = n_{ECCE} + \text{Value}$ for antenna port $p_0$, and $n_{ECCE}$ is the number of the first ECCE used for transmission of the corresponding EPDCCH for the EPDCCH set $\tilde{k}$ in subframe $n-k_m$ and the corresponding m, where $k_m$ is the smallest value in set K such that UE detects a EPDCCH for the EPDCCH set $\tilde{k}$ in subframe $n-k_m$ (i.e., the last DL subframe where the EPDCCH is detected within a bundling window). When two antenna port transmission is configured for PUCCH format 1a/1b, the PUCCH resource for HARQ-ACK bundling for antenna port $p_1$ can be given by $n_{PUCCH}^{(1,\tilde{p}_1)} = n_{ECCE} + \text{Value} + 1$.

If there is only a PDSCH transmission where there is not a corresponding PDCCH/EPDCCH detected within subframe(s) $n-k$, where $k \in K$ and K is defined in Table 3, the UE can use PUCCH format 1a/1b and PUCCH resource $n_{PUCCH}^{(1,\tilde{p})}$ with the value of $n_{PUCCH}^{(1,\tilde{p})}$ is determined according to higher layer configuration and Table 4 (i.e., FIG. 6). For a UE configured for two antenna port transmission for PUCCH format 1a/1b and HARQ-ACK bundling, a PUCCH resource value in Table 4 maps to two PUCCH resources with the first PUCCH resource $n_{PUCCH}^{(1,\tilde{p}_0)}$ for antenna port $p_0$ and the second PUCCH resource $n_{PUCCH}^{(1,\tilde{p}_1)}$ for antenna port $p_1$, otherwise, the PUCCH resource value maps to a single PUCCH resource $n_{PUCCH}^{(1,\tilde{p}_0)}$ for antenna port $p_0$.

Therefore, for HARQ-ACK bundling or HARQ-ACK multiplexing with M=1 without carrier aggregation (CA), the PUCCH resource used can be derived from a last DL subframe within a bundling window depending on whether the DL subframe is configured by PDCCH or EPDCCH.

In another configuration, for TDD HARQ-ACK multiplexing and sub-frame n with M>1 and one configured serving cell, where M is the number of elements in the set K defined in Table 3, denote $n_{PUCCH,i}^{(1)}$ as the PUCCH resource derived from sub-frame $n-k_i$ and HARQ-ACK(i) as the ACK/negative ACK/discontinuous transmission (DTX) response (i.e., ACK/NACK/DTX) from sub-frame $n-k_i$, where $k_i \in K$ (defined in Table 3) and $0 \leq i \leq M-1$.

For a PDSCH transmission indicated by the detection of corresponding PDCCH/EPDCCH or a PDCCH/EPDCCH indicating downlink SPS release in sub-frame $n-k_i$ where $k_i \in K$, and if the subframe $n-k_i$ is not configured for EPDCCH, the PUCCH resource can be represented by $n_{PUCCH,i}^{(1)} = (M-i-1) \cdot N_c + i \cdot N_{c+1} + n_{CCE,i} + N_{PUCCH}^{(1)}$, where c is selected from $\{0, 1, 2\}$ such that $N_c \leq n_{CCE,i} < N_{c+1}$, $N_c = \max\{0, \lfloor [N_{RB}^{DL} \cdot (N_{sc}^{RB} \cdot c - 4)]/36 \rfloor\}$, $n_{CCE,i}$ is the number of the first CCE used for transmission of the corresponding PDCCH in subframe $n-k_i$, and $N_{PUCCH}^{(1)}$ is configured by higher layers.

For a PDSCH transmission indicated by the detection of corresponding PDCCH/EPDCCH or a PDCCH/EPDCCH indicating downlink SPS release in sub-frame $n-k_i$ where $k_i \in K$, and if the subframe $n-k_i$ is configured for EPDCCH, the PUCCH resource $n_{PUCCH,i}^{(1)} = n_{ECCE,i} + \text{Value}$, $n_{ECCE,i}$ is the number of the first ECCE used for transmission of the corresponding EPDCCH for the EPDCCH set $\tilde{k}$ in subframe $n-k_i$.

For a PDSCH transmission where there is not a corresponding PDCCH/EPDCCH detected in subframe $n-k_i$, the value of $n_{PUCCH,i}^{(1)}$ can be determined according to higher layer configuration and Table 4 (i.e., FIG. 6).

In another configuration, for TDD HARQ-ACK multiplexing with PUCCH format 1b with channel selection and two configured serving cells and a subframe n with $M \leq 2$ where M is the number of elements in the set K defined in Table 3, the UE can transmit b(0)b(1) (e.g., constellation bits) on PUCCH resource $N_{PUCCH}^{(1)}$ selected from A PUCCH resources, $n_{PUCCH,j}^{(1)}$ where $0 \leq j \leq A-1$ and $A \in \{2, 3, 4\}$, according to Table 6 (i.e., FIG. 8), Table 7 (i.e., FIG. 9), and Table 8 (i.e., FIG. 10) in subframe n using PUCCH format 1b. For a subframe n with M=1, HARQ-ACK(j) denotes the ACK/NACK/DTX response for a transport block or SPS release PDCCH associated with serving cell, where the transport block and serving cell for HARQ-ACK (j) and A PUCCH resources are given by Table 9 (i.e., FIG. 11). For a subframe n with M=2, HARQ-ACK(j) denotes the ACK/NACK/DTX response for a PDSCH transmission or SPS release PDCCH within subframe(s) given by set K on each serving cell, where the subframes on each serving cell for HARQ-ACK(j) and A PUCCH resources are given by Table 10 (i.e., FIG. 12). The UE can determine the A PUCCH resources, $n_{PUCCH,j}^{(1)}$ associated with HARQ-ACK (j) where $0 \leq j \leq A-1$ in Table 9 (i.e., FIG. 11) for M=1 and Table 10 (i.e., FIG. 12) for M=2, according to the following:

For a PDSCH transmission indicated by the detection of a corresponding PDCCH/EPDCCH in subframe $n-k_m$, where $k_m \in K$ on a primary cell, or for a PDCCH/EPDCCH indicating downlink SPS release in subframe $n-k_m$, where $k_m \in K$ on the primary cell, and if the subframe $n-k_m$ is not configured for EPDCCH, the PUCCH resource can be represented by $n_{PUCCH,j}^{(1)} = (M-m-1) \cdot N_c + m \cdot N_{c+1} + n_{CCE,m} + N_{PUCCH}^{(1)}$, where c is selected from $\{0, 1, 2, 3\}$ such that $N_c \leq n_{CCE,m} < N_{c+1}$, $N_c = \max\{0, \lfloor [N_{RB}^{DL} \cdot (N_{sc}^{RB} \cdot c - 4)]/36 \rfloor\}$ where $N_{RB}^{DL}$ is determined from the primary cell, and for a subframe n with M=1 and a transmission mode that supports up to two transport blocks on the serving cell where the corresponding PDSCH transmission occurs, the PUCCH resource $n_{PUCCH,j+1}^{(1)}$ is given by $n_{PUCCH,j+1}^{(1)} = (M-m-1) \cdot N_c + m \cdot N_{c+1} + n_{CCE,m} + 1 + N_{PUCCH}^{(1)}$ where $n_{CCE,m}$ is the number of the first CCE used for transmission of a corresponding DCI assignment and $N_{PUCCH}^{(1)}$ is configured by higher layers.

For a PDSCH transmission indicated by the detection of a corresponding PDCCH/EPDCCH in subframe $n-k_m$, where $k_m \in K$ on a primary cell, or for a PDCCH/EPDCCH indicating downlink SPS release in subframe $n-k_m$, where $k_m \in K$ on the primary cell, and if the subframe $n-k_m$ is configured for EPDCCH, the PUCCH resource can be represented by $n_{PUCCH,j}^{(1)} = n_{ECCE,m} + \text{Value}$ and for a subframe n with M=1 and a transmission mode that supports up to two transport blocks on the serving cell where the corresponding PDSCH transmission occurs, the PUCCH resource $n_{PUCCH,j+1}^{(1)}$ is given by $n_{PUCCH,j+1}^{(1)} = n_{ECCE,m} +$ Value+1 where $n_{ECCE,m}$ is the number of the first CCE used for transmission of a corresponding DCI assignment by EPDCCH for the EPDCCH set $\tilde{k}$.

For a PDSCH transmission on the primary cell where there is not a corresponding PDCCH/EPDCCH detected within subframe(s) n–k, where k∈K, the value of $n_{PUCCH,j}^{(1)}$ can be determined according to higher layer configuration and Table 4 (i.e., FIG. 6).

In another configuration, for TDD HARQ-ACK multiplexing with PUCCH format 1b with channel selection and sub-frame n with M>2 and two configured serving cells, where M is the number of elements in the set K defined in Table 3, denotes $n_{PUCCH,i}^{(1)}$ as the PUCCH resource derived from the transmissions in M DL sub-frames associated with the UL subframe n, where 0≤i≤3. $n_{PUCCH,0}^{(1)}$ and $n_{PUCCH,1}^{(1)}$ are associated with the PDSCH transmission(s) or a PDCCH indicating downlink SPS release on the primary cell and $n_{PUCCH,2}^{(1)}$ and $n_{PUCCH,3}^{(1)}$ are associated with the PDSCH transmission(s) on the secondary cell.

For a primary cell, if there is a PDSCH transmission on the primary cell without a corresponding PDCCH/EPDCCH detected within the subframe(s) n–k, where k∈K, the value of $n_{PUCCH,0}^{(1)}$ can be determined according to higher layer configuration and Table 5 (i.e., FIG. 7).

If there is a PDSCH transmission on the primary cell without a corresponding PDCCH/EPDCCH detected within the subframe(s) n–k, where k∈K, for a PDSCH transmission on the primary cell indicated by the detection of a corresponding PDCCH/EPDCCH in subframe $n-k_m$, where $k_m \in K$ with the DAI value in the PDCCH/EPDCCH equal to '1' or a PDCCH indicating downlink SPS release in subframe $n-k_m$, where $k_m \in K$ with the DAI value in the PDCCH/EPDCCH equal to '1', and if the subframe $n-k_m$ is not configured for EPDCCH, the PUCCH resource $n_{PUCCH,1}^{(1)} = (M-m-1) \cdot N_c + m \cdot N_{c+1} + n_{CCE,m} + N_{PUCCH}^{(1)}$ where c is selected from {0, 1, 2, 3} such that $N_c \le n_{CCE,m} < N_{c+1}$, $N_c = \max\{0, \lfloor [N_{RB}^{DL} \cdot (N_{sc}^{RB} \cdot c - 4)]/36 \rfloor\}$, where $n_{CCE,m}$ is the number of the first CCE used for transmission of the corresponding PDCCH for the EPDCCH set $\tilde{k}$ in subframe $n-k_m$ and $N_{PUCCH}^{(1)}$ is configured by higher layers.

If there is a PDSCH transmission on the primary cell without a corresponding PDCCH/EPDCCH detected within the subframe(s) n–k, where k∈K, for a PDSCH transmission on the primary cell indicated by the detection of a corresponding PDCCH/EPDCCH in subframe $n-k_m$, where $k_m \in K$ with the DAI value in the PDCCH/EPDCCH equal to '1' or a PDCCH indicating downlink SPS release in subframe $n-k_m$, where $k_m \in K$ with the DAI value in the PDCCH/EPDCCH equal to '1', and if the subframe $n-k_m$ is configured for EPDCCH, the PUCCH resource $n_{PUCCH,1}^{(1)} = n_{ECCE,m} +$ Value where $n_{ECCE,m}$ is the number of the first ECCE used for transmission of the corresponding EPDCCH for the EPDCCH set $\tilde{k}$ in subframe $n-k_m$.

If there is a PDSCH transmission on the primary cell without a corresponding PDCCH/EPDCCH detected within the subframe(s) n–k, where k∈K, HARQ-ACK(0) can be the ACK/NACK/DTX response for the PDSCH transmission without a corresponding PDCCH/EPDCCH. For 0≤j≤M−1, if a PDSCH transmission with a corresponding PDCCH/EPDCCH and DAI value in the PDCCH/EPDCCH equal to 'j' or a PDCCH/EPDCCH indicating downlink SPS release and with DAI value in the PDCCH/EPDCCH equal to 'j' is received, HARQ-ACK(j) can be the corresponding ACK/NACK/DTX response; otherwise HARQ-ACK(j) can be set to DTX.

Otherwise (e.g., if there is a PDSCH transmission on the primary cell with a corresponding PDCCH/EPDCCH detected within the subframe(s) n–k, where k∈K), for a PDSCH transmission on the primary cell indicated by the detection of a corresponding PDCCH/EPDCCH in subframe $n-k_m$, where $k_m \in K$ with the DAI value in the PDCCH/EPDCCH equal to either '1' or '2' or a PDCCH/EPDCCH indicating downlink SPS release in subframe $n-k_m$, where $k_m \in K$ with the DAI value in the PDCCH/EPDCCH equal to either '1' or '2', and if the subframe $n-k_m$ is not configured for EPDCCH, the PUCCH resource $n_{PUCCH,i}^{(1)} = (M-m-1) \cdot N_c + m \cdot N_{c+1} + n_{CCE,m} + N_{PUCCH}^{(1)}$, where c is selected from {0, 1, 2, 3} such that $N_c \le n_{CCE,m} < N_{c+1}$, $N_c = \max\{0, \lfloor [N_{RB}^{DL} \cdot (N_{sc}^{RB} \cdot c - 4)]/36 \rfloor\}$, where $n_{CCE,m}$ is the number of the first CCE used for transmission of the corresponding PDCCH in subframe $n-k_m$, $N_{PUCCH}^{(1)}$ is configured by higher layers, i=0 for the corresponding PDCCH with the DAI value equal to '1' and i=1 for the corresponding PDCCH with the DAI value equal to '2'.

Otherwise (e.g., if there is a PDSCH transmission on the primary cell with a corresponding PDCCH/EPDCCH detected within the subframe(s) n–k, where k∈K), for a PDSCH transmission on the primary cell indicated by the detection of a corresponding PDCCH/EPDCCH in subframe $n-k_m$, where $k_m \in K$ with the DAI value in the PDCCH/EPDCCH equal to either '1' or '2' or a PDCCH/EPDCCH indicating downlink SPS release in subframe $n-k_m$, where $k_m \in K$ with the DAI value in the PDCCH/EPDCCH equal to either '1' or '2', and if the subframe $n-k_m$ is configured for EPDCCH, the PUCCH resource $n_{PUCCH,i}^{(1)} = n_{ECCE,m} +$ Value where $n_{ECCE,m}$ is the number of the first ECCE used for transmission of the corresponding EPDCCH for the EPDCCH set $\tilde{k}_0$ in subframe $n-k_m$ i=0 for the corresponding EPDCCH with the DAI value equal to '1' and i=1 for the corresponding EPDCCH for the EPDCCH set $\tilde{k}_1$ with the DAI value equal to '2'.

Otherwise (e.g., if there is a PDSCH transmission on the primary cell with a corresponding PDCCH/EPDCCH detected within the subframe(s) n–k, where k∈K), for 0≤j≤M−1, if a PDSCH transmission with a corresponding PDCCH/EPDCCH and DAI value in the PDCCH/EPDCCH equal to 'j+1' or a PDCCH/EPDCCH indicating downlink SPS release and with DAI value in the PDCCH/EPDCCH equal to 'j+1' is received, HARQ-ACK(j) is the corresponding ACK/NACK/DTX response; otherwise HARQ-ACK(j) can be set to DTX.

A secondary cell may not transmit an EPDCCH, so PUCCH resource allocation may use a legacy PDCCH rule for a secondary cell.

In another example, if only PDCCHs are within a bundling window, the legacy PUCCH resource allocation method can be used. If only EPDCCHs are within a bundling window, a PUCCH resource allocation method associated with EPDCCH can be used. If at least one EPDCCH is within a bundling window, either the legacy PUCCH resource allocation method can be used, or a PUCCH resource allocation associated with EPDCCH can be used, as previously described.

The same principles illustrated for the case of PUCCH format 1a/1b or PUCCH format 1b with channel selection can be applicable when PUCCH format 3 is configured (e.g., a primary cell fall-back case).

Another example provides a method 500 for conditional time division duplex (TDD) physical uplink control channel (PUCCH) resource allocation for a hybrid automatic retransmission re-quest-acknowledge (HARQ-ACK) transmission in a subframe n at a user equipment (UE), as shown in the flow chart in FIG. 13. The method may be executed as instructions on a machine, computer circuitry, or a processor for the UE, where the instructions are included on at least one computer readable medium or one non-transitory machine readable storage medium. The method includes the operation of recognizing that a downlink control channel type received within a prior specified subframe is a physical downlink control channel (PDCCH) or an enhanced physical downlink control channel (EPDCCH), wherein the prior specified subframe occurs in time before the subframe n, as in block 510. The operation of determining a PUCCH resource for the HARQ-ACK transmission using a lowest control channel element (CCE) index of a physical downlink control channel (PDCCH) when the downlink control channel type is the PDCCH follows, as in block 520. The next operation of the method can be determining the PUCCH resource for the HARQ-ACK transmission using a lowest enhanced CCE (ECCE) index of the EPDCCH when the downlink control channel type is the EPDCCH, as in block 530.

In an example, the prior specified subframe can include a subframe n−k, where k∈K, and where a downlink association set index K is defined in a Table 10.1.3.1-1 in a Third Generation Partnership Project (3GPP) Long Term Evolution (LTE) standard Release 11 Technical Specification (TS) 36.213 (e.g., Table 3), and K can include a set of M elements $\{k_0, k_1, \ldots k_{M-1}\}$ depending on the subframe n and an uplink/downlink (UL/DL) configuration.

In another example, the operation of determining the PUCCH resource for the subframe n−k using a lowest enhanced CCE (ECCE) index of an EPDCCH can further configured to determine the PUCCH resource using a parameter Value represent by Value=ARO+AP+(m+1)·$N_{PUCCH}^{(1,k)}$ where acknowledgement (ACK)/negative ACK (ACK/NACK) Resource Offset (ARO) is an integer offset value derived from a downlink control information (DCI) in the EPDCCH, an antenna port (AP) is parameter (0, . . . , 3), a $N_{PUCCH}^{(1,k)}$ is a UE specific starting offset value for an EPDCCH set k̃, and m is an integer, where $k_m$ is the smallest value in a set K such that the UE detects an EPDCCH for an EPDCCH set k̃ in a subframe n−$k_m$.

For one configured serving cell and the subframe n, with M=1, the operation of determining the PUCCH resource $n_{PUCCH}^{(1,\tilde{p})}$ for the HARQ-ACK transmission using the lowest CCE index $n_{CCE}$ of the PDCCH can further include selecting a C value out of {0, 1, 2, 3} which makes $N_c \leq n_{CCE} < N_{c+1}$ and using the PUCCH resource $n_{PUCCH}^{(1,\tilde{p})}$ represented by $n_{PUCCH}^{(1,\tilde{p}_0)}=(M-m-1)\cdot N_c+m\cdot N_{c+1}+n_{CCE}+N_{PUCCH}^{(1)}$ for antenna port $p_0$ and $n_{PUCCH}^{(1,\tilde{p}_0)}=(M-m-1)\cdot N_c+m\cdot N_{c+1}+n_{CCE}+1+N_{PUCCH}^{(1)}$ for antenna port $p_1$, where $n_{CCE}$ is a first CCE index number used for transmission of a corresponding PDCCH in subframe n−$k_m$ and the corresponding m, where $k_m$ is the smallest value in set K such that UE detects a PDCCH in subframe n−$k_m$, $N_c=\max\{0, \lfloor [N_{RB}^{DL} \cdot (N_{sc}^{RB} \cdot c-4)]/36 \rfloor\}$, $N_{RB}^{DL}$ is a downlink bandwidth configuration, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE. The antenna port $p_1$ can be used when two antenna port transmission is configured. The operation of determining the PUCCH resource $n_{PUCCH}^{(1,\tilde{p})}$ for the HARQ-ACK transmission using the lowest ECCE index $n_{ECCE}$ of the EPDCCH can further include using the PUCCH resource $n_{PUCCH}^{(1,\tilde{p})}$ represented by $n_{PUCCH}^{(1,\tilde{p}_0)}=n_{ECCE}+\text{Value}$ for antenna port $p_0$ and $n_{PUCCH}^{(1,\tilde{p}_1)}=n_{ECCE}+\text{Value}+1$ for antenna port $p_1$, where Value is the parameter, $n_{ECCE}$ is the number of the first ECCE used for transmission of the corresponding EPDCCH for the EPDCCH set k̃ in subframe n−$k_m$ and a corresponding m, where $k_m$ is the smallest value in set K such that UE detects an EPDCCH for the EPDCCH set k̃ in subframe n−$k_m$. The antenna port $p_1$ can be used when two antenna port transmission is configured.

For one configured serving cell and a subframe n with M>1 where 0≤i≤M−1, the operation of determining the PUCCH resource $n_{PUCCH,i}^{(1)}$ for the HARQ-ACK transmission using the lowest CCE index $n_{CCE,i}$ of the PDCCH can be represented by $n_{PUCCH,i}^{(1)}=(M-i-1)\cdot N_c+i \cdot N_{c+1}+n_{CCE,i}+N_{PUCCH}^{(1)}$, where C is selected from {0, 1, 2, 3} such that $N_c \leq n_{CCE,i} < N_{c+1}$, $n_{CCE,i}$ is a first CCE index number used for transmission of a corresponding PDCCH in subframe n−$k_i$, $N_c=\max\{0, \lfloor [N_{RB}^{DL} \cdot (N_{sc}^{RB} \cdot c-4)]/36 \rfloor\}$, $N_{RB}^{DL}$ is a downlink bandwidth configuration, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE. The operation of determining the PUCCH resource $n_{PUCCH,i}^{(1)}$ for the HARQ-ACK transmission using the lowest ECCE index $n_{ECCE,i}$ of the EPDCCH can be represented by $n_{PUCCH,i}^{(1)}=n_{ECCE,i}+\text{Value}$, where Value is the parameter, $n_{ECCE,i}$ is the number of the first ECCE used for transmission of the corresponding EPDCCH for the EPDCCH set k̃ in subframe n−$k_i$.

For at least two configured serving cells and a subframe n with M≤2 where $k_m \in K$ on a primary cell, and 0≤j≤A−1 and A∈{2, 3, 4}, the operation of determining the PUCCH resource $n_{PUCCH,j}^{(1)}$ for the HARQ-ACK transmission using the lowest CCE index $n_{CCE,m}$ of the PDCCH can be represented by $n_{PUCCH,j}^{(1)}=(M-m-1)\cdot N_c+N_{c+1}+n_{CCE,m}+N_{PUCCH}^{(1)}$ and $n_{PUCCH,j+1}^{(1)}=(M-m-1)\cdot N_c+m \cdot N_{c+1}+n_{CCE,m}+1+N_{PUCCH}^{(1)}$, where c is selected from {0, 1, 2, 3} such that $N_c \leq n_{CCE,m} < N_{c+1}$, $n_{CCE,m}$ is a first CCE index number used for transmission of a corresponding PDCCH in subframe n−$k_i$, $N_c=\max\{0, \lfloor [N_{RB}^{DL} \cdot (N_{sc}^{RB} \cdot c-4)]/36 \rfloor\}$, $N_{RB}^{DL}$ is a downlink bandwidth configuration from the primary cell, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE, and $n_{PUCCH,j+1}^{(1)}$ is used for a subframe n and a transmission mode that support up to two transport block on a serving cell where a corresponding physical downlink shared channel (PDSCH) transmission occurs. The operation of determining the PUCCH resource $n_{PUCCH,j}^{(1)}$ for the HARQ-ACK transmission using the lowest ECCE index $n_{ECCE,m}$ of the EPDCCH can be represented by $n_{PUCCH,j}^{(1)}=n_{ECCE,m}+\text{Value}$ and $n_{PUCCH,j+1}^{(1)}=n_{ECCE,m}+\text{Value}+1$, where Value is the parameter, $n_{ECCE,m}$ is the number of the first ECCE used for transmission of the corresponding DCI assignment by EPDCCH for the EPDCCH set k̃ in subframe n−$k_m$, and $n_{PUCCH,j+1}^{(1)}$ is used for a subframe n and a transmission mode that support up to two transport block on a serving cell where a corresponding PDSCH transmission occurs.

For at least two configured serving cells and a subframe n with M>2 where k∈K, $k_m \in K$ for a primary cell, the operation of determining the PUCCH resource $n_{PUCCH,1}^{(1)}$ for the HARQ-ACK transmission using the lowest CCE index $n_{CCE,m}$ of the PDCCH can be represented by $n_{PUCCH,1}^{(1)}=(M-m-1)\cdot N_c+m\cdot N_{c+1}+n_{CCE,m}+N_{PUCCH}^{(1)}$, where c is selected from {0, 1, 2, 3} such that $N_c \leq n_{CCE,m} < N_{c+1}$, $n_{CCE,m}$ is a first CCE index number used for transmission of a corresponding PDCCH in subframe $n-k_m$, $N_c=\max\{0, \lfloor [N_{RB}^{DL} \cdot (N_{sc}^{RB} \cdot c-4)]/36 \rfloor\}$, $N_{RB}^{DL}$ is a downlink bandwidth configuration from the primary cell, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE. The operation of determining the PUCCH resource $n_{PUCCH,1}^{(1)}$ for the HARQ-ACK transmission using the lowest ECCE index $n_{ECCE,m}$ of the EPDCCH can be represented by $n_{PUCCH,1}^{(1)} = n_{ECCE,m} + \text{Value}$, where Value is the parameter, $n_{ECCE,m}$ is the number of the first ECCE used for transmission of the corresponding EPDCCH for the EPDCCH set $\tilde{k}$ in subframe $n-k_m$.

Another example provides functionality 600 of computer circuitry of a processor on a user equipment (UE) operable to provide conditional physical uplink control channel (PUCCH) resource allocation in time division duplex (TDD) for a hybrid automatic retransmission re-quest-acknowledge (HARQ-ACK) transmission in a subframe n, as shown in the flow chart in FIG. 14. The functionality may be implemented as a method or the functionality may be executed as instructions on a machine, where the instructions are included on at least one computer readable medium or one non-transitory machine readable storage medium. The computer circuitry can be configured to receive a downlink control channel within a prior specified subframe, wherein the prior specified subframe occurs in time before the subframe n, as in block 610. The computer circuitry can be further configured to recognize that a downlink control channel type received within the prior specified subframe is a physical downlink control channel (PDCCH) or an enhanced physical downlink control channel (EPDCCH), as in block 620. The computer circuitry can also be configured to determine a PUCCH resource for the HARQ-ACK transmission using a lowest control channel element (CCE) index of the PDCCH when the received downlink control channel type is the PDCCH, as in block 630. The computer circuitry can be further configured to determine the PUCCH resource for the HARQ-ACK transmission using a lowest enhanced CCE (ECCE) index of the EPDCCH when the received downlink control channel type is the EPDCCH, as in block 640.

In an example, the prior specified subframe can include a subframe $n-k$, where $k \in K$, and where a downlink association set index K is defined in a Table 10.1.3.1-1 in a Third Generation Partnership Project (3GPP) Long Term Evolution (LTE) standard Release 11 Technical Specification (TS) 36.213 (e.g., Table 3), and K can include a set of M elements $\{k_0, k_1, \ldots k_{M-1}\}$ depending on the subframe n and an uplink/downlink (UL/DL) configuration. In another example, the subframe $n-k$ includes a PDCCH and a configured EPDCCH subframe.

In another configuration, the computer circuitry configured to determine the PUCCH resource for the subframe $n-k$ using the lowest ECCE index of an EPDCCH can be further configured to determine the PUCCH resource using a parameter (e.g., Value). The parameter can be derived from an acknowledgement (ACK)/negative ACK (ACK/NACK) Resource Offset (ARO), an antenna port (AP), a UE specific starting offset value for an EPDCCH set, and an integer m, where a $k_m$ is the smallest value in a set K such that the UE detects an EPDCCH in a subframe $n-k_m$.

For one configured serving cell and the subframe n, with M=1 where M is a number of elements in the set $K \in \{k_0, k_1, \ldots k_{M-1}\}$, the computer circuitry configured to determine the PUCCH resource $n_{PUCCH}^{(1,\tilde{p})}$ for a HARQ-ACK transmission using the lowest CCE index $n_{CCE}$ of the PDCCH can select a c value out of $\{0, 1, 2, 3\}$ which makes $N_c \leq n_{CCE} < N_{c+1}$ and uses the PUCCH resource $n_{PUCCH}^{(1,\tilde{p})}$ represented by $n_{PUCCH}^{(1,\tilde{p}_0)} = (M-m-1) \cdot N_c + m \cdot N_{c+1} + n_{CCE} + N_{PUCCH}^{(1)}$ for antenna port $p_0$ and $n_{PUCCH}^{(1,\tilde{p}_1)} = (M-m-1) \cdot N_c + m \cdot N_{c+1} + n_{CCE} + 1 + N_{PUCCH}^{(1)}$ for antenna port $p_1$, where $n_{CCE}$ is a first CCE index number used for transmission of a corresponding PDCCH in subframe $n-k_m$ and the corresponding m, where $k_m$ is the smallest value in set K such that UE detects a PDCCH in subframe $n-k_m$, $N_c = \max\{0, \lfloor [N_{RB}^{DL} \cdot (N_{sc}^{RB} \cdot c-4)]/36 \rfloor\}$, $N_{RB}^{DL}$ is a downlink bandwidth configuration, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE. The antenna port $p_1$ can be used when two antenna port transmission is configured. The computer circuitry configured to determine the PUCCH resource $n_{PUCCH}^{(1,\tilde{p})}$ for the HARQ-ACK transmission using the lowest ECCE index $n_{ECCE}$ of the EPDCCH can use the PUCCH resource $n_{PUCCH}^{(1,\tilde{p})}$ represented by $n_{PUCCH}^{(1,\tilde{p}_0)} = n_{ECCE} + \text{Value}$ for antenna port $p_0$ and $n_{PUCCH}^{(1,\tilde{p}_1)} = n_{ECCE} + \text{Value} + 1$ for antenna port $p_1$, where Value is the parameter, $n_{ECCE}$ is the number of the first ECCE used for transmission of the corresponding EPDCCH for the EPDCCH set $\tilde{k}$ in subframe $n-k_m$ and a corresponding m, where $k_m$ is the smallest value in set K such that UE detects an EPDCCH for the EPDCCH set $\tilde{k}$ in subframe $n-k_m$. The antenna port $p_1$ can be used when two antenna port transmission is configured.

For one configured serving cell and a subframe n with M>1 where M is the number of elements in the set $K \in \{k_0, k_1, \ldots k_{M-1}\}$ and $0 \leq i \leq M-1$, the computer circuitry configured to determine the PUCCH resource $n_{PUCCH,i}^{(1)}$ for a HARQ-ACK transmission using the lowest CCE index $n_{CCE,i}$ can be represented by $n_{PUCCH,i}^{(1)} = (M-i-1) \cdot N_c + i \cdot N_{c+1} + n_{CCE,i} + N_{PUCCH}^{(1)}$, where c is selected from $\{0, 1, 2, 3\}$ such that $N_c \leq n_{CCE,i} < N_{c+1}$, $n_{CCE,i}$ is a first CCE index number used for transmission of a corresponding PDCCH in subframe $n-k_i$, $N_c = \max\{0, \lfloor [N_{RB}^{DL} \cdot (N_{sc}^{RB} \cdot c-4)]/36 \rfloor\}$, $N_{RB}^{DL}$ is a downlink bandwidth configuration, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE. The computer circuitry configured to determine the PUCCH resource $n_{PUCCH,i}^{(1)}$ for the HARQ-ACK transmission using the lowest ECCE index $n_{ECCE,i}$ can be represented by $n_{PUCCH,i}^{(1)} = n_{ECCE,i} + \text{Value}$, where Value is the parameter, $n_{ECCE,i}$ is the number of the first ECCE used for transmission of the corresponding EPDCCH for the EPDCCH set $\tilde{k}$ in subframe $n-k_i$.

For at least two configured serving cells and a subframe n with $M \leq 2$ where M is the number of elements in the set $K \in \{k_0, k_1, \ldots k_{M-1}\}$, $k_m \in K$ on a primary cell, and $0 \leq j \leq A-1$ and $A \in \{2, 3, 4\}$, the computer circuitry configured to determine the PUCCH resource $n_{PUCCH,j}^{(1)}$ for a HARQ-ACK transmission using the lowest CCE index $n_{CCE,m}$ can be represented by $n_{PUCCH,j}^{(1)} = (M-m-1) \cdot N_c + m \cdot N_{c+1} + n_{CCE,m} + N_{PUCCH}^{(1)}$ and $n_{PUCCH,j+1}^{(1)} = (M-m-1) \cdot N_c + m \cdot N_{c+1} + n_{CCE,m} + 1 + N_{PUCCH}^{(1)}$, where c is selected from $\{0, 1, 2, 3\}$ such that $N_c \leq n_{CCE,m} < N_{c+1}$, $n_{CCE,m}$ is a first CCE index number used for transmission of a corresponding PDCCH in subframe $n-k_i$, $N_c = \max\{0, \lfloor [N_{RB}^{DL} \cdot (N_{sc}^{RB} \cdot c-4)]/36 \rfloor\}$, $N_{RB}^{DL}$ is a downlink bandwidth configuration from the primary cell, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE, and $n_{PUCCH,j+1}^{(1)}$ is used for a subframe n and a transmission mode that support up to two transport block on a serving cell where a corresponding physical downlink shared channel (PDSCH) transmission occurs. The computer circuitry configured to determine the PUCCH resource $n_{PUCCH,j}^{(1)}$ for the HARQ-ACK transmission using the lowest ECCE index $n_{ECCE,m}$ can be represented by $n_{PUCCH,j}^{(1)}=n_{ECCE,m}+\text{Value}$ and $n_{PUCCH,j+1}^{(1)}=n_{ECCE,m}+\text{Value}+1$, where Value is the parameter, $n_{ECCE,m}$ is the number of the first ECCE used for transmission of the corresponding DCI assignment by EPDCCH for the EPDCCH set $\tilde{k}$ in subframe $n-k_m$, and $n_{PUCCH,j+1}^{(1)}$ is used for a subframe n and a transmission mode that support up to two transport block on a serving cell where a corresponding PDSCH transmission occurs.

For at least two configured serving cells and a subframe n with M>2 where M is the number of elements in the set $K \in \{k_0, k_1, \ldots k_{M-1}\}$, $k \in K$, $k_m \in K$ for a primary cell, the computer circuitry configured to determine the PUCCH resource $n_{PUCCH,1}^{(1)}$ for a HARQ-ACK transmission using the lowest CCE index $n_{CCE,m}$ can be represented by $n_{PUCCH,1}^{(1)}=(M-m-1) \cdot N_c + m \cdot N_{c+1} + n_{CCE,m} + N_{PUCCH}^{(1)}$, where c is selected from {0, 1, 2, 3} such that $N_c \leq n_{CCE,m} < N_{c+1}$, $n_{CCE,m}$ is a first CCE index number used for transmission of a corresponding PDCCH in subframe $n-k_m$, $N_c=\max\{0, \lfloor [N_{RB}^{DL} \cdot (N_{sc}^{RB} \cdot c - 4)]/36 \rfloor\}$, $N_{RB}^{DL}$ is a downlink bandwidth configuration from the primary cell, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE. The computer circuitry configured to determine the PUCCH resource $n_{PUCCH,1}^{(1)}$ for the HARQ-ACK transmission using the lowest ECCE index $n_{ECCE,m}$ can be represented by $n_{PUCCH,1}^{(1)}=n_{ECCE,m}+\text{Value}$, where Value is the parameter, $n_{ECCE,m}$ is the number of the first ECCE used for transmission of the corresponding EPDCCH for the EPDCCH set $\tilde{k}$ in subframe $n-k_m$.

In another example, the computer circuitry can use the PUCCH resource $n_{PUCCH}^{(\tilde{p})}$ for the HARQ-ACK transmission in a subframe n for a $\tilde{p}$ mapped to an antenna port p for a Third Generation Partnership Project (3GPP) Long Term Evolution (LTE) standard Release 11 PUCCH format 1a or 1b, or 3GPP PUCCH LTE standard Release 11 format 1b with channel selection, or 3GPP PUCCH LTE standard Release 11 format 3.

FIG. 15 illustrates an example node (e.g., serving node 710 and cooperation node 750) and an example wireless device 720. The node can include a node device 712 and 752. The node device or the node can be configured to communicate with the wireless device (e.g., UE). The node device, device at the node, or the node can be configured to communicate with other nodes via a backhaul link 748 (optical or wired link), such as an X2 application protocol (X2AP). The node device can include a processor 714 and 754 and a transceiver 716 and 756. The transceiver can be configured to receive a HARQ-ACK feedback in a PUCCH resource. The transceiver 716 and 756 can be further configured to communicate with the coordination node via an X2 application protocol (X2AP). The processor can be further configured to a reverse procedure can be implemented for PUCCH detection as disclosed herein. The serving node can generate both a primary cell (PCell) and a secondary cell (SCell). The node (e.g., serving node 710 and cooperation node 750) can include a base station (BS), a Node B (NB), an evolved Node B (eNB), a baseband unit (BBU), a remote radio head (RRH), a remote radio equipment (RRE), a remote radio unit (RRU), or a central processing module (CPM).

The device (used by a node) can be configured to detect a physical uplink control channel (PUCCH) resource allocation in time division duplex (TDD) for a hybrid automatic retransmission re-quest-acknowledge (HARQ-ACK) transmission in a subframe n. The transceiver 716 and 756 can be configured to receive a PUCCH resource in a subframe n configured with a downlink control channel type. The processor 714 and 754 can be configured to: Determine when the subframe n is configured with a physical downlink control channel (PDCCH) or an enhanced physical downlink control channel (EPDCCH); decode the PUCCH resource for a HARQ-ACK transmission using a lowest control channel element (CCE) index of a physical downlink control channel (PDCCH) when the downlink control channel type is the PDCCH; and decode the PUCCH resource for the HARQ-ACK transmission using a lowest enhanced CCE (ECCE) index of an EPDCCH when the downlink control channel type is the EPDCCH.

In an example, the downlink control channel type can be received in a subframe n-k, where k∈K, where a downlink association set index K is defined in a Table 10.1.3.1-1 (e.g., Table 3) in a Third Generation Partnership Project (3GPP) Long Term Evolution (LTE) standard Release 11 Technical Specification (TS) 36.213, and K includes a set of M elements $\{k_0, k_1, \ldots k_{M-1}\}$ depending on the subframe n and a uplink/downlink (UL/DL) configuration.

In another example, the processor configured to decode the PUCCH resource for the HARQ-ACK transmission using the lowest ECCE index of the EPDCCH can be further configured to decode the PUCCH resource using a parameter Value represent by Value=ARO+AP+(m+1)·$N_{PUCCH}^{(1,\tilde{k})}$ where acknowledgement (ACK)/negative ACK (ACK/NACK) Resource Offset (ARO) is an integer offset value derived from a downlink control information (DCI) in the EPDCCH, an antenna port (AP) is parameter (0, ..., 3), a $N_{PUCCH}^{(1,\tilde{k})}$ is a UE specific starting offset value for an EPDCCH set $\tilde{k}$, and m is an integer, where $k_m$ is the smallest value in a set K such that the UE detects an EPDCCH for an EPDCCH set $\tilde{k}$ in subframe $n-k_m$.

The wireless device 720 (e.g., UE) can include a transceiver 724 and a processor 722. The wireless device (i.e., device) can be configured provide conditional physical uplink control channel (PUCCH) resource allocation in time division duplex (TDD) for a hybrid automatic retransmission re-quest-acknowledge (HARQ-ACK) transmission in a subframe n, as described in 500 of FIG. 13 or 600 of FIG. 14.

FIG. 16 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 16 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a user equipment (UE), comprising one or more processors and memory configured to:
identify, at the UE, a downlink control channel;
determine when the downlink control channel is an enhanced physical downlink control channel (EPDCCH); and
select an enhanced physical uplink control channel (PUCCH) resource allocation for a hybrid automatic retransmission re-quest-acknowledge (HARQ-ACK) transmission when the downlink control channel is the EPDCCH,
wherein the downlink control channel is identified within a prior specified subframe that is received in time before a subframe n, wherein the prior specified subframe includes a subframe n-k, where k∈K, where a downlink association set index K is defined in a Table 10.1.3.1-1 in a Third Generation Partnership Project (3GPP) Long Term Evolution (LTE) standard Release 11 Technical Specification (TS) 36.213, and K includes a set of M elements $\{k_0, k_1, \ldots k_{M-1}\}$ depending on a subframe n and an uplink/downlink (UL/DL) configuration.

2. The apparatus of claim 1, further configured to:
determine when the downlink control channel is a physical downlink control channel (PDCCH); and
select a legacy PUCCH resource allocation for the HARQ-ACK transmission when the downlink control channel is the PDCCH.

3. The apparatus of claim 1, further configured to determine the PUCCH resource for the subframe n-k using an integer m, where a $k_m$ is the smallest value in a set K such that the UE detects an EPDCCH in a subframe $n-k_m$.

4. The apparatus of claim 3, wherein for one configured serving cell and the subframe n, with M=1 where M is a number of elements in the set $K \in \{k_0, k_1, \ldots k_{M-1}\}$:
the apparatus is further configured to determine the enhanced PUCCH resource $n_{PUCCH}^{(1,\tilde{p})}$ for the HARQ-ACK transmission using a lowest ECCE index $n_{ECCE}$ of the EPDCCH uses the enhanced PUCCH resource $n_{PUCCH}^{(1,\tilde{p})}$ represented by $n_{PUCCH}^{(1,\tilde{p}_0)} = n_{ECCE} + \text{Value}$ for antenna port $p_0$ and $n_{PUCCH}^{(1,\tilde{p}_1)} = n_{ECCE} + \text{Value} + 1$ for antenna port $p_1$, where Value is the parameter, $n_{ECCE}$ is the number of the first ECCE used for transmission of the corresponding EPDCCH for the EPDCCH set $\tilde{k}$ in subframe $n-k_m$ and a corresponding m, where $k_m$ is the smallest value in set K such that UE detects an EPDCCH for the EPDCCH set $\tilde{k}$ in subframe $n-k_m$, and antenna port $p_1$ is used when two antenna port transmission is configured; or
the apparatus is further configured to determine the legacy PUCCH resource $n_{PUCCH}^{(1,\tilde{p})}$ for a HARQ-ACK transmission using a lowest CCE index $n_{CCE}$ of the PDCCH selects a c value out of $\{0, 1, 2, 3\}$ which makes $N_c \leq n_{CCE} < N_{c+1}$ and uses the legacy PUCCH resource $n_{PUCCH}^{(1,\tilde{p})}$ represented by $n_{PUCCH}^{(1,\tilde{p}_0)} = (M-m-1) \cdot N_c + m \cdot N_{c+1} + n_{CCE} + N_{PUCCH}^{(1)}$ for antenna port $p_0$ and $n_{PUCCH}^{(1,\tilde{p}_1)} = (M-m-1) \cdot N_c + m \cdot N_{c+1} + n_{CCE} + 1 + N_{PUCCH}^{(1)}$ for antenna port $p_1$, where $n_{CCE}$ is a first CCE index number used for transmission of a corresponding PDCCH in subframe $n-k_m$ and the corresponding m, where $k_m$ is the smallest value in set K such that UE detects a PDCCH in subframe $n-k_m$, $N_c = \max\{0, \lfloor [N_{RB}^{DL} \cdot (N_{sc}^{RB} \cdot c - 4)]/36 \rfloor\}$, $N_{RB}^{DL}$ is a downlink bandwidth configuration from the primary cell, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE, and antenna port $p_1$ is used when two antenna port transmission is configured.

5. The apparatus of claim 3, wherein for one configured serving cell and a subframe n with M>1 where M is the number of elements in the set $K \in \{k_0, k_1, \ldots k_{M-1}\}$ and $0 \leq i \leq M-1$:
the apparatus is further configured to determine the enhanced PUCCH resource $n_{PUCCH,i}^{(1)}$ for the HARQ-ACK transmission using a lowest ECCE index $n_{ECCE,i}$ is represented by $n_{PUCCH,i}^{(1)} = n_{ECCE,i} + \text{Value}$, where Value is the parameter, $n_{ECCE,i}$ is the number of the first ECCE used for transmission of the corresponding EPDCCH for the EPDCCH set $\tilde{k}$ in subframe $n-k_i$; or
the apparatus is further configured to determine the legacy PUCCH resource $n_{PUCCH,i}^{(1)}$ for a HARQ-ACK transmission using the lowest CCE index $n_{CCE,i}$ is represented by $n_{PUCCH,i}^{(1)} = (M-i-1) \cdot N_c + i \cdot N_{c+1} + n_{CCE,i} + N_{PUCCH}^{(1)}$, where c is selected from $\{0, 1, 2, 3\}$ such that $N_c \leq n_{CCE,i} < N_{c+1}$, $n_{CCE,i}$ is a first CCE index number used for transmission of a corresponding PDCCH in subframe $n-k_i$, $N_c = \max\{0, \lfloor [N_{RB}^{DL} \cdot (N_{sc}^{RB} \cdot c - 4)]/36 \rfloor\}$, $N_{RB}^{DL}$ is a downlink bandwidth configuration, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE.

6. The apparatus of claim 3, wherein for at least two configured serving cells and a subframe n with M≤2 where M is the number of elements in the set $K \in \{k_0, k_1, \ldots k_{M-1}\}$, $k_m \in K$ on a primary cell, and $0 \leq j \leq A-1$ and $A \in \{2,3,4\}$:
the apparatus is further configured to determine the enhanced PUCCH resource $n_{PUCCH,j}^{(1)}$ for the HARQ-ACK transmission using the lowest ECCE index $n_{ECCE,m}$ is represented by $n_{PUCCH,j}^{(1)} = n_{ECCE,m} + \text{Value}$ and $n_{PUCCH,j+1}^{(1)} = n_{ECCE,m} + \text{Value} + 1$, where Value is the parameter, $n_{ECCE,m}$ is the number of the first ECCE used for transmission of the corresponding DCI assignment by EPDCCH for the EPDCCH set $\tilde{k}$ in subframe $n-k_m$, and $n_{PUCCH,j+1}^{(1)}$ is used for a subframe n and a transmission mode that support up to two transport block on a serving cell where a corresponding PDSCH transmission occurs; or
the apparatus is further configured to determine the legacy PUCCH resource $n_{PUCCH,j}^{(1)}$ for the HARQ-ACK transmission using the lowest ECCE index $n_{CCE,m}$ is represented by $n_{PUCCH,j}^{(1)} = (M-m-1) \cdot N_c + m \cdot N_{c+1} + n_{CCE,m} + N_{PUCCH}^{(1)}$ and $n_{PUCCH,j+1}^{(1)} = (M-m-1) \cdot N_c + m \cdot N_{c+1} + n_{CCE,m} + N_{PUCCH}^{(1)}$, where c is selected from $\{0, 1, 2, 3\}$ such that $N_c \leq n_{CCE,m} < N_{c+1}$, $n_{CCE,m}$ is a first CCE index number used for transmission of a corresponding PDCCH in subframe $n-k_m$, $N_c = \max\{0, \lfloor [N_{RB}^{DL} \cdot (N_{sc}^{RB} \cdot c - 4)]/36 \rfloor\}$, $N_{RB}^{DL}$ is a downlink bandwidth configuration from the primary cell, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE, and $n_{PUCCH,j+1}^{(1)}$ is used for a subframe n and a transmission mode that support up to two transport block on a serving cell where a corresponding physical downlink shared channel (PDSCH) transmission occurs.

7. The apparatus of claim 3, wherein for at least two configured serving cells and a subframe n with $M>2$ where M is the number of elements in the set $K \in \{k_0, k_1, \ldots k_{M-1}\}$, $k \in K$, $k_m \in K$ for a primary cell:

the apparatus is further configured to determine the enhanced PUCCH resource $n_{PUCCH,1}^{(1)}$ for the HARQ-ACK transmission using the lowest ECCE index $n_{ECCE,m}$ is represented by $n_{PUCCH,1}^{(1)} = n_{ECCE,m} +$ Value, where Value is the parameter, $n_{ECCE,m}$ is the number of the first ECCE used for transmission of the corresponding EPDCCH for the EPDCCH set $\tilde{k}$ in subframe $n-k_m$; or the apparatus is further configured to determine the legacy PUCCH resource $n_{PUCCH,1}^{(1)}$ for the HARQ-ACK transmission using the lowest CCE index $n_{CCE,m}$ is represented by $n_{PUCCH,1}^{(1)} = (M-m-1) \cdot N_c + m \cdot N_{c+1} + n_{CCE,m} + N_{PUCCH}^{(1)}$, where c is selected from $\{0, 1, 2, 3\}$ such that $N_c \leq n_{CCE,m} < N_{c+1}$, $n_{CCE,m}$ is a first CCE index number used for transmission of a corresponding PDCCH in subframe $n-k_m$, $N_c = \max\{0, \lfloor [N_{RB}^{DL} \cdot (N_{sc}^{RB} \cdot c - 4)]/36 \rfloor\}$, $N_{RB}^{DL}$ is a downlink bandwidth configuration from the primary cell, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE.

8. The apparatus of claim 1, wherein the UE includes an antenna, a display screen, a speaker, a microphone, a graphics processor, an application processor, an internal memory, or a non-volatile memory port.

9. At least one non-transitory computer readable storage medium having instructions embodied thereon, the instructions when executed perform the following:

identifying, using at least one processor at a user equipment (UE), a downlink control channel;

determining, using the at least one processor at the UE, when the downlink control channel is an enhanced physical downlink control channel (EPDCCH); and selecting, using the at least one processor at the UE, an enhanced physical uplink control channel (PUCCH) resource allocation for a hybrid automatic retransmission re-quest-acknowledge (HARQ-ACK) transmission when the downlink control channel is the EPD-CCH, wherein the downlink control channel is identified within a prior specified subframe that is received in time before a subframe n, wherein the prior specified subframe includes a subframe n–k, where $k \in K$, where a downlink association set index K is defined in a Table 10.1.3.1-1 in a Third Generation Partnership Project (3GPP) Long Term Evolution (LTE) standard Release 11 Technical Specification (TS) 36.213, and K includes a set of M elements $\{k_0, k_1, \ldots k_{M-1}\}$ depending on the subframe n and a uplink/downlink (UL/DL) configuration.

10. The at least one non-transitory computer readable storage medium of claim 9, further comprising instructions when executed perform the following:

determining when the downlink control channel is a physical downlink control channel (PDCCH); and selecting a legacy PUCCH resource allocation for the HARQ-ACK transmission when the downlink control channel is the PDCCH.

11. The at least one non-transitory computer readable storage medium of claim 9, further comprising instructions when executed perform the following:

determining the enhanced PUCCH resource using a parameter Value represent by Value=ARO+ AP+(m+1)·$N_{PUCCH}^{(1,\tilde{k})}$ where acknowledgement (ACK)/negative ACK (ACK/NACK) Resource Offset (ARO) is an integer offset value derived from a downlink control information (DCI) in the EPDCCH, an antenna port (AP) is parameter (0, . . . , 3), a $N_{PUCCH}^{(1,\tilde{k})}$ is a UE specific starting offset value for an EPDCCH set $\tilde{k}$, and m is an integer, where $k_m$ is the smallest value in a set K such that the UE detects an EPDCCH for an EPDCCH set $\tilde{k}$ in a subframe $n-k_m$.

12. The at least one non-transitory computer readable storage medium of claim 9, wherein for one configured serving cell and the subframe n with M=1:

further comprising instructions when executed perform the following: determining the legacy PUCCH resource $n_{PUCCH}^{(1,\tilde{p})}$ for a HARQ-ACK transmission using the lowest CCE index $n_{CCE}$ of the PDCCH can select a c value out of $\{0, 1, 2, 3\}$ which makes $N_c \leq n_{CCE} < N_{c+1}$ and using the legacy PUCCH resource $n_{PUCCH}^{(1,\tilde{p})}$ represented by $n_{PUCCH}^{(1,\tilde{p}_0)} = (M-m-1) \cdot N_c + m \cdot N_{c+1} + n_{CCE} + N_{PUCCH}^{(1)}$ for antenna port $p_0$ and $n_{PUCCH}^{(1,\tilde{p}_1)} = (M-m-1) \cdot N_c + m \cdot N_{c+1} + n_{CCE} + 1 + N_{PUCCH}^{(1)}$ for antenna port $p_1$, where $n_{CCE}$ is a first CCE index number used for transmission of a corresponding PDCCH in subframe $n-k_m$ and the corresponding m, where $k_m$ is the smallest value in set K such that UE detects a PDCCH in subframe $n-k_m$, $N_c = \max\{0, \lfloor [N_{RB}^{DL} \cdot (N_{sc}^{RB} \cdot c - 4)]/36 \rfloor\}$, $N_{RB}^{DL}$ is a downlink bandwidth configuration, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE, wherein antenna port $p_1$ can be used when two antenna port transmission is configured; or further comprising instructions when executed perform the following: determining the enhanced PUCCH resource $n_{PUCCH}^{(1,\tilde{p})}$ for the HARQ-ACK transmission using the lowest ECCE index $n_{ECCE}$ of the EPDCCH further comprises using the enhanced PUCCH resource $n_{PUCCH}^{(1,\tilde{p})}$ represented by $n_{PUCCH}^{(1,\tilde{p}_0)} = n_{ECCE} +$Value for antenna port $p_0$ and $n_{PUCCH}^{(1,\tilde{p}_1)} = n_{ECCE} +$Value+1 for antenna port $p_1$, where $n_{ECCE}$ is the number of the first ECCE used for transmission of the corresponding EPDCCH for the EPDCCH set $\tilde{k}$ in subframe $n-k_m$ and a corresponding m, where $k_m$ is the smallest value in set K such that UE detects an EPDCCH for the EPDCCH set $\tilde{k}$ in subframe $n-k_m$, and antenna port $p_1$ can be used when two antenna port transmission is configured.

13. The at least one non-transitory computer readable storage medium of claim 9, wherein for one configured serving cell and the subframe n with $M>1$ where $0 \leq i \leq M-1$:

further comprising instructions when executed perform the following: determining the legacy PUCCH resource $n_{PUCCH,i}^{(1)}$ for a HARQ-ACK transmission using the lowest CCE index $n_{CCE,i}$ is represented by $n_{PUCCH,i}^{(1)} = (M-i-1) \cdot N_c + i \cdot N_{c+1} + n_{CCE,i} + N_{PUCCH}^{(1)}$, where c is selected from $\{0, 1, 2, 3\}$ such that $N_c \leq n_{CCE,i} < N_{c+1}$, $n_{CCE,i}$ is a first CCE index number used for transmission of a corresponding PDCCH in subframe $n-k_i$, $N_c = \max\{0, \lfloor [N_{RB}^{DL} \cdot (N_{sc}^{RB} \cdot c - 4)]/36 \rfloor\}$, $N_{RB}^{DL}$ is a downlink bandwidth configuration, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE; or further comprising instructions when executed perform the following: determining the enhanced PUCCH resource $n_{PUCCH,i}^{(1)}$ for the HARQ-ACK transmission using the lowest ECCE index $n_{ECCE,i}$ is represented by $n_{PUCCH,i}^{(1)} = n_{ECCE,i} + \text{Value}$, where $n_{ECCE,i}$ is the number of the first ECCE used for transmission of the corresponding EPDCCH for the EPDCCH set $\tilde{k}$ in subframe $n-k_i$.

14. The at least one non-transitory computer readable storage medium of claim 9, wherein for at least two configured serving cells and a subframe n with M≤2 where $k_m \in K$ on a primary cell, and $0 \leq j \leq A-1$ and $A \in \{2, 3, 4\}$:

further comprising instructions when executed perform the following: determining the legacy PUCCH resource $n_{PUCCH,j}^{(1)}$ for a HARQ-ACK transmission using the lowest CCE index $n_{CCE,m}$ is represented by $n_{PUCCH,j}^{(1)} = (M-m-1) \cdot N_c + m \cdot N_{c+1} + n_{CCE,m} + N_{PUCCH}^{(1)}$ and $n_{PUCCH,j+1}^{(1)} = (M-m-1) \cdot N_c + m \cdot N_{c+1} + n_{CCE,m} + 1 + N_{PUCCH}^{(1)}$, where c is selected from $\{0, 1, 2, 3\}$ such that $N_c \leq n_{CCE,m} < N_{c+1}$, $n_{CCE,m}$ is a first CCE index number used for transmission of a corresponding PDCCH in subframe $n-k_j$, $N_c = \max\{0, \lfloor [N_{RB}^{DL} \cdot (N_{sc}^{RB} \cdot c - 4)]/36 \rfloor\}$, $N_{RB}^{DL}$ is a downlink bandwidth configuration from the primary cell, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE, and $n_{PUCCH,j+1}^{(1)}$ is used for a subframe n and a transmission mode that support up to two transport block on a serving cell where a corresponding physical downlink shared channel (PDSCH) transmission occurs; or further comprising instructions when executed perform the following: determining the enhanced PUCCH resource $n_{PUCCH,j}^{(1)}$ for the HARQ-ACK transmission using the lowest ECCE index $n_{ECCE,m}$ is represented by $n_{PUCCH,j}^{(1)} = n_{ECCE,m} + \text{Value}$ and $n_{PUCCH,j+1}^{(1)} = n_{ECCE,m} + \text{Value} + 1$, where $n_{ECCE,m}$ is the number of the first ECCE used for transmission of the corresponding DCI assignment by EPDCCH for the EPDCCH set $\tilde{k}$ in subframe $n-k_m$, and $n_{PUCCH,j+1}^{(1)}$ is used for a subframe n and a transmission mode that support up to two transport block on a serving cell where a corresponding PDSCH transmission occurs.

15. The at least one non-transitory computer readable storage medium of claim 9, wherein for at least two configured serving cells and a subframe n with M>2 where $k \in K$, $k_m \in K$ for a primary cell:

further comprising instructions when executed perform the following: determining the legacy PUCCH resource $n_{PUCCH,1}^{(1)}$ for the HARQ-ACK transmission using the lowest CCE index $n_{CCE,m}$ is represented by $n_{PUCCH,1}^{(1)} = (M-m-1) \cdot N_c + m \cdot N_{c+1} + n_{CCE,m} + N_{PUCCH}^{(1)}$, where c is selected from $\{0, 1, 2, 3\}$ such that $N_c \leq n_{CCE,m} < N_{c+1}$, $n_{CCE,m}$ is a first CCE index number used for transmission of a corresponding PDCCH in subframe $n-k_m$, $N_c = \max\{0, \lfloor [N_{RB}^{DL} \cdot (N_{sc}^{RB} \cdot c - 4)]/36 \rfloor\}$, $N_{RB}^{DL}$ is a downlink bandwidth configuration from the primary cell, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE; or further comprising instructions when executed perform the following: determining the enhanced PUCCH resource $n_{PUCCH,1}^{(1)}$ for the HARQ-ACK transmission using the lowest ECCE index $n_{ECCE,m}$ is represented by $n_{PUCCH,1}^{(1)} = n_{ECCE,m} + \text{Value}$, where $n_{ECCE,m}$ is the number of the first ECCE used for transmission of the corresponding EPDCCH for the EPDCCH set $\tilde{k}$ in subframe $n-k_m$.

16. An apparatus of a user equipment (UE) operable to provide physical uplink control channel (PUCCH) resource allocation in time division duplex (TDD) for a hybrid automatic retransmission re-quest-acknowledge (HARQ-ACK) transmission in a subframe n, the apparatus comprising one or more processors and memory configured to:

detect a downlink control channel within a prior specified subframe that is received in time before a subframe n, wherein the prior specified subframe includes a subframe n−k, wherein n and k are integers;

identify when the downlink control channel detected within the prior specified subframe n−k is an enhanced physical downlink control channel (EPDCCH); and determine an enhanced PUCCH resource allocation for the HARQ-ACK transmission using a lowest enhanced CCE (ECCE) index of the EPDCCH when the downlink control channel detected in the prior specified subframe n−k is the EPDCCH.

17. The apparatus of claim 16, further configured to:

identify when the downlink control channel detected within the prior specified subframe n−k is a physical downlink control channel (PDCCH);

determine a legacy PUCCH resource allocation for the HARQ-ACK transmission using a lowest control channel element (CCE) index of the PDCCH when the downlink control channel detected in the prior specified subframe n−k is the PDCCH.

18. The apparatus of claim 16, wherein a downlink control channel type is received in the subframe n−k, where $k \in K$, where a downlink association set index K is defined in a Table 10.1.3.1-1 in a Third Generation Partnership Project (3GPP) Long Term Evolution (LTE) standard Release 11 Technical Specification (TS) 36.213, and K includes a set of M elements $\{k_0, k_1, \ldots k_{M-1}\}$ depending on the subframe n and a uplink/downlink (UL/DL) configuration.

19. The apparatus of claim 16, further configured to determine the enhanced PUCCH resource for the subframe n−k using an integer m, where a $k_m$ is the smallest value in a set K such that the UE detects an EPDCCH in a subframe $n-k_m$.

20. The apparatus of claim 16, further configured to decode the enhanced PUCCH resource using a parameter Value represent by $\text{Value} = \text{ARO} + \text{AP} + (m+1) \cdot N_{PUCCH}^{(1,k)}$ where acknowledgement (ACK)/negative ACK (ACK/NACK) Resource Offset (ARO) is an integer offset value derived from a downlink control information (DCI) in the EPDCCH, an antenna port (AP) is parameter $(0, \ldots, 3)$, a $N_{PUCCH}^{(1,k)}$ is a UE specific starting offset value for an EPDCCH set $\tilde{k}$, and m is an integer, where $k_m$ m is the smallest value in a set K such that the UE detects an EPDCCH for an EPDCCH set $\tilde{k}$ in subframe $n-k_m$.

21. The apparatus of claim 16, wherein the UE includes an antenna, a display screen, a speaker, a microphone, a graphics processor, an application processor, an internal memory, or a non-volatile memory port.

* * * * *